United States Patent
Murakami

(10) Patent No.: US 9,703,174 B2
(45) Date of Patent: Jul. 11, 2017

(54) OPTICAL APPARATUS EQUIPPED WITH BARRIER MECHANISM

(71) Applicant: CANON KABUSHIKI KAISHA, Tokyo (JP)

(72) Inventor: Taro Murakami, Musashino (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/595,670

(22) Filed: Jan. 13, 2015

(65) Prior Publication Data

US 2015/0198862 A1    Jul. 16, 2015

(30) Foreign Application Priority Data

Jan. 16, 2014   (JP) .................................. 2014-006033
Jan. 16, 2014   (JP) .................................. 2014-006035

(51) Int. Cl.
*G03B 11/04*        (2006.01)

(52) U.S. Cl.
CPC .................................. *G03B 11/043* (2013.01)

(58) Field of Classification Search
CPC ..... G03B 11/04; G03B 11/043; G03B 11/045; G03B 11/048
See application file for complete search history.

(56) References Cited

U.S. PATENT DOCUMENTS

| 8,016,497 B2 | 9/2011 | Murakami |
| 8,182,160 B2 * | 5/2012 | Kang .................... G03B 11/041 |
| | | 396/452 |
| 2005/0135799 A1 * | 6/2005 | Tanaka et al. ................. 396/448 |
| 2010/0183291 A1 * | 7/2010 | Kudoh ........................... 396/448 |
| 2011/0157700 A1 * | 6/2011 | Torii .............................. 359/511 |

FOREIGN PATENT DOCUMENTS

| JP | 05027301 A | 2/1993 |
| JP | 2008185728 A | 8/2008 |
| JP | 2010072060 A | 4/2010 |
| JP | 2011008140 A | 1/2011 |

\* cited by examiner

*Primary Examiner* — Clayton E Laballe
*Assistant Examiner* — Noam Reisner
(74) *Attorney, Agent, or Firm* — Rossi, Kimms & McDowell LLP

(57) ABSTRACT

A barrier mechanism of an optical apparatus capable of preventing generation of a gap between barrier blades and an opening part in a closed state without complicating a configuration. Barrier blades are arranged overlapping in an optical axis direction, and are driven by a barrier driving ring to rotate in an opening-and-closing direction for opening and closing the opening part. A barrier barrel is arranged at the outer peripheral side of the barrier driving ring, and holds the barrier blades. The barrier blades includes a main barrier blade that is arranged at an image surface side and is rotatably supported by the barrier barrel with a first shaft, and auxiliary barrier blades that are rotatably supported by a second shaft that is provided on the subject side of the main barrier blade. The first shaft and the second shaft are arranged in parallel but are not coaxial.

4 Claims, 24 Drawing Sheets

OPTICAL APPARATUS EQUIPPED WITH BARRIER MECHANISM

BACKGROUND OF THE INVENTION

Field of the Invention

The present invention relates to an optical apparatus containing an image pickup apparatus, such as a film-based camera, a digital still camera, or a digital video camera. Particularly, the present invention relates to an optical apparatus equipped with a barrier mechanism that covers a lens openably and closably.

Description of the Related Art

Some digital still cameras have a barrier mechanism that covers a lens exposed to a subject side openably and closably on a lens barrel.

For example, a barrier mechanism in which barrier blades supported by a barrier ring rotate together with the barrier ring due to rotation of the barrier ring (revolution) and rotate with respect to the barrier ring (rotation) is proposed (see Japanese Laid-Open Patent Publication (Kokai) No. 2008-185728 (JP 2008-185728A)).

Moreover, a barrier mechanism that has a first barrier blade, a second barrier blade that overlaps with the first barrier blade in an optical axis direction, and a third barrier blade that does not overlap with the first and second barrier blades in the optical axis direction is proposed (see Japanese Laid-Open Patent Publication (Kokai) No. 2010-72060 (JP 2010-72060A)).

Furthermore, a barrier mechanism in which projections are formed on distal ends of a pair of barrier blades and depressions are formed on proximal ends of the barrier blades so that a projection of one blade corresponds to a depression of the other blade is proposed (see Japanese Laid-Open Patent Publication (Kokai) No. H5-27301 (JP H5-27301A)). In this proposal, when a pair of the barrier blades close, since a projection of one (the other) barrier blade fits in a depression of the other (one) barrier blade, surfaces of a pair of the barrier blades are arranged on the same plane. This causes a good closed state.

Moreover, a barrier mechanism that has a pair of main blades and a pair of auxiliary blades that open and close by following movements of the main blades that are opened and closed by a barrier driving means is proposed (see Japanese Laid-Open Patent Publication (Kokai) No. 2011-008140 (JP 2011-008140A)). In this proposal, a barrier closing interlocked part that is interlocked with a barrier closing interlocking part provided on the main blade is provided on the auxiliary blade, and a barrier disconnection prevention part in a U-shape that prevents disconnection between the barrier closing interlocking part and the barrier closing interlocked part is provided on the auxiliary blade.

Incidentally, when a barrier mechanism is provided corresponding to an outer shape of a lens, enlargement of an image circle and increasing of field angle enlarge an outer diameter of a lens barrel and also enlarge a size of a camera.

In this case, the outer diameter of the lens barrel decreases with respect to an opening part of the barrier mechanism by increasing the number of the barrier blades. However, if the number of the barrier blades is increased, it is necessary to increase an accuracy of a position of a bearing of a rotation shaft for the barrier blades so as not to generate a gap between the barrier blades in a closed state.

However, the mechanism of the above-mentioned JP 2008-185728A is disadvantageous to increase the accuracy of position of the bearing because the bearing of the rotation shaft for the barrier blades moves in a rotational direction of the barrier ring.

On the other hand, although the mechanism of the above-mentioned JP 2010-72060A does not move the bearing of the rotation shaft for the barrier blades, a gap that is not covered by the first and second barrier blades in the closed state is covered by a third barrier blade that is smaller than the first and second barrier blades. This is caused by increasing the number of barrier blades. Since the third barrier blade is driven independent of the first and second barrier blades, an energizing member is separately needed, which complicates the configuration and makes the assembly be troublesome.

A gap generated in the opening in the closed state of the barrier blades will be described with reference to FIG. 25. As shown in FIG. 25, an opening part 301a of a barrier cover 301 is formed in a rectangular shape, and the center of a rotation shaft 303 of a barrier blade 302 is arranged on the center line of the opening part 301a parallel to the long side of the opening part 301a.

At the position where the barrier blade 302 rotates from an opened state by the minimum angle θ1 in a direction of an arrow A in the drawing so as to cover an upper right corner in FIG. 25 of the opening part 301a, an upper left part 301a1 of the opening part 301a is not covered, and a gap occurs. This is because the center of the circumscribed circle of the barrier blade 302 moves in directions of X1 and Y1 in the drawing when the barrier blade 302 rotates by the minimum angle θ1 around the shaft 303, the center of the circumscribed circle of the barrier blade 302 after the rotation shifts to the right side in the drawing.

Moreover, if the number of barrier blades is increased, the area of each barrier blade will decrease, and a barrier blade will become small relatively to the area of the opening part of the barrier driving ring. The opening part of the barrier driving ring needs a comparatively large opening area in order to allow an object light passing through a lens. Accordingly, if the barrier blade becomes small, the opening part of the barrier driving ring may become too large relatively, and the tip part of the barrier blade may not run on an end surface of the barrier driving ring in the closed state of the barrier blade. Accordingly, the tip part of the barrier blade cannot withstand static pressure received.

SUMMARY OF THE INVENTION

The present invention provides a mechanism that is capable of preventing generation of a gap between barrier blades and an opening part in a closed state without complicating a configuration and without making assembly be troublesome even if an outer diameter of a lens barrel becomes small with respect to the opening part of the barrier mechanism by increasing the number of barrier blades.

Moreover, the present invention provides a mechanism that is capable of withstanding static pressure received with a tip part of a barrier blade by allowing a tip part of a barrier blade to run on an end surface of a barrier driving ring in a closed state even if an outer diameter of a lens barrel becomes small with respect to the opening part of the barrier mechanism by increasing the number of barrier blades.

Accordingly, a first aspect of the present invention provides an optical apparatus equipped with a barrier mechanism covering a lens exposed to a subject side through an opening part, the barrier mechanism comprising a barrier driving ring, barrier blades configured to be arranged overlapping in an optical axis direction, and to be driven by the barrier driving ring to rotate in an opening-and-closing direction for opening and closing the opening part, and a barrier barrel configured to be arranged at the outer peripheral side of the barrier driving ring, and to hold the barrier blades. The barrier blades includes a main barrier blade that is arranged at an image surface side and is supported by the barrier barrel with a first shaft so as to be rotatable in the opening-and-closing direction, and auxiliary barrier blades that are supported by a second shaft that is provided on the subject side of the main barrier blade so as to be rotatable in the opening-and-closing direction. And the first shaft and the second shaft are arranged in parallel but are not coaxial. The second shaft is provided on the main barrier blade.

Accordingly, a second aspect of the present invention provides an optical apparatus equipped with a barrier mechanism covering a lens exposed to a subject side through an opening part, the barrier mechanism comprising a pair of first barrier blades configured to be to rotatable in an opening-and-closing direction for opening and closing the opening part, and a barrier driving ring configured to drive the pair of first barrier blades. A distal difference depression facing to a subject side and a proximal difference depression facing an image surface side are formed in a distal end and a proximal end, respectively, of each of the pair of first barrier blades. The distal difference depression of one first barrier blade between the pair of first barrier blades is inserted into the proximal difference depression of the other first barrier blades in a rotational direction, and the distal difference depression of the other first barrier blade is inserted into the proximal difference depression of one first barrier blade in the rotational direction at the of the first barrier blade of a different direction in a closed state, so that the distal difference depressions and the proximal difference depressions are arranged facing mutually in an optical axis direction. Tip parts of the distal difference depressions project from the inserted proximal difference depressions, reach a subject-side end surface of the barrier driving ring, and move along the subject-side end surface of the barrier driving ring during the rotation from the closed state to an opened state.

According to the first aspect of the present invention, generation of a gap between the barrier blades and the opening part in the closed state is prevented without complicating the configuration and without making assembly be troublesome even if the outer diameter of the lens barrel becomes small with respect to the opening part of the barrier mechanism by increasing the number of the barrier blades.

According to the second aspect of the present invention, the tip part of the barrier blade withstands static pressure received by allowing the tip part of a barrier blade to run on the end surface of the barrier driving ring in the closed state even if the outer diameter of the lens barrel becomes small with respect to the opening part of the barrier mechanism by increasing the number of barrier blades.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
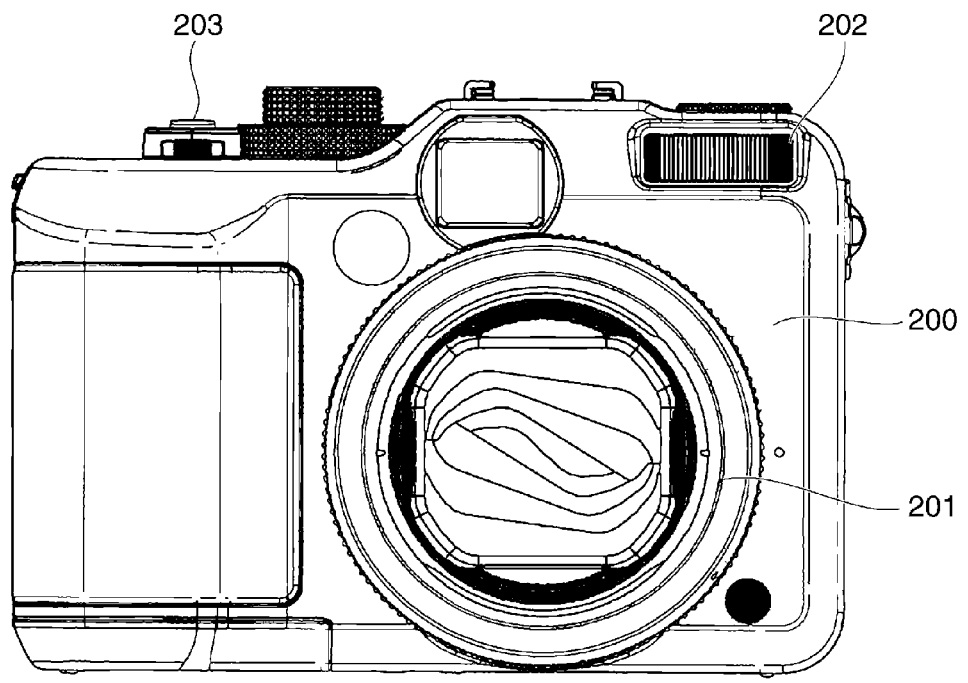
FIG. 1 is a front view showing a digital still camera that is an example of an embodiment of an optical apparatus according to the present invention viewed from a subject side.

FIG. 1 is a front view showing a digital still camera that is an example of an embodiment of an optical apparatus according to the present invention viewed from a subject side.

As shown in FIG. 1, the digital still camera in this embodiment is provided with a lens barrel 201 having a barrier mechanism, a flash unit 202, etc. at the front side of a camera body 200, and is provided with a release button 203 etc. at the top side of the camera body 200. Moreover, a display unit, a manual operation button group, etc. (not shown) are provided on the back side of the camera body 200.

The lens barrel 201 extends from a collapsed position shown in FIG. 1 to a shooting position when a power switch (not shown) of the camera body 200 is turned ON, and is retracted from the shooting position to the collapsed position when the power switch is turned OFF. Then, when the lens barrel 201 is in the shooting position and the release button 203 is pressed, a subject image is formed on an image pickup device 80 (see FIG. 2), such as a CCD sensor or a CMOS sensor, through an image pickup optical system in the lens barrel 201. The subject image is photoelectrically converted into an electrical signal, and then, image data is generated. When a subject is dark, the flash unit 202 emits light and a subject is irradiated with a strobe light. Moreover, the lens barrel 201 is provided with the barrier mechanism that covers a first lens unit 10 (see FIG. 2) that will be exposed to the subject side at the time of shooting.

Figure 2:
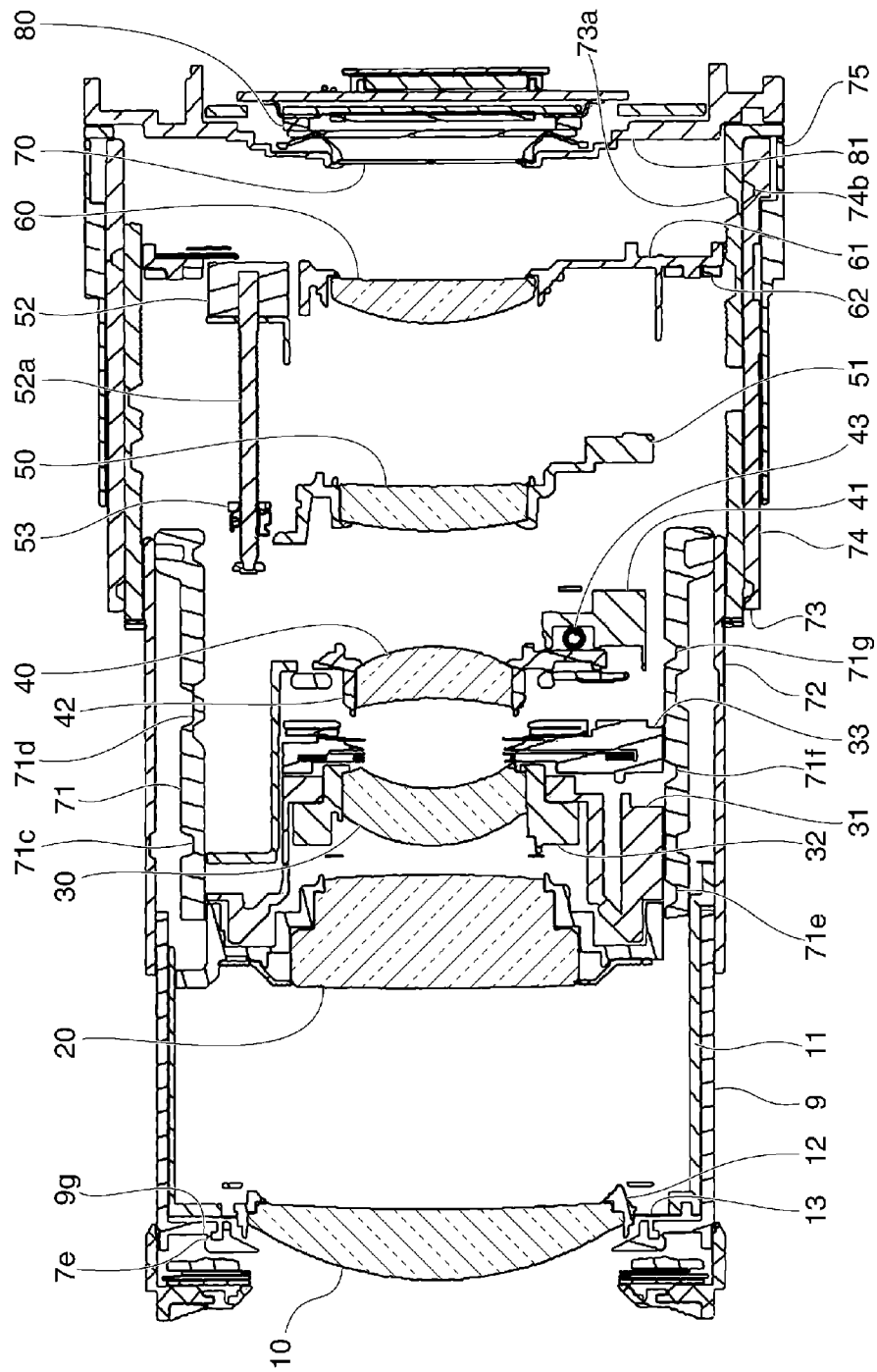
FIG. 2 is a sectional view showing a lens barrel of the camera shown in FIG. 1 in a shooting position.
Figure 3:
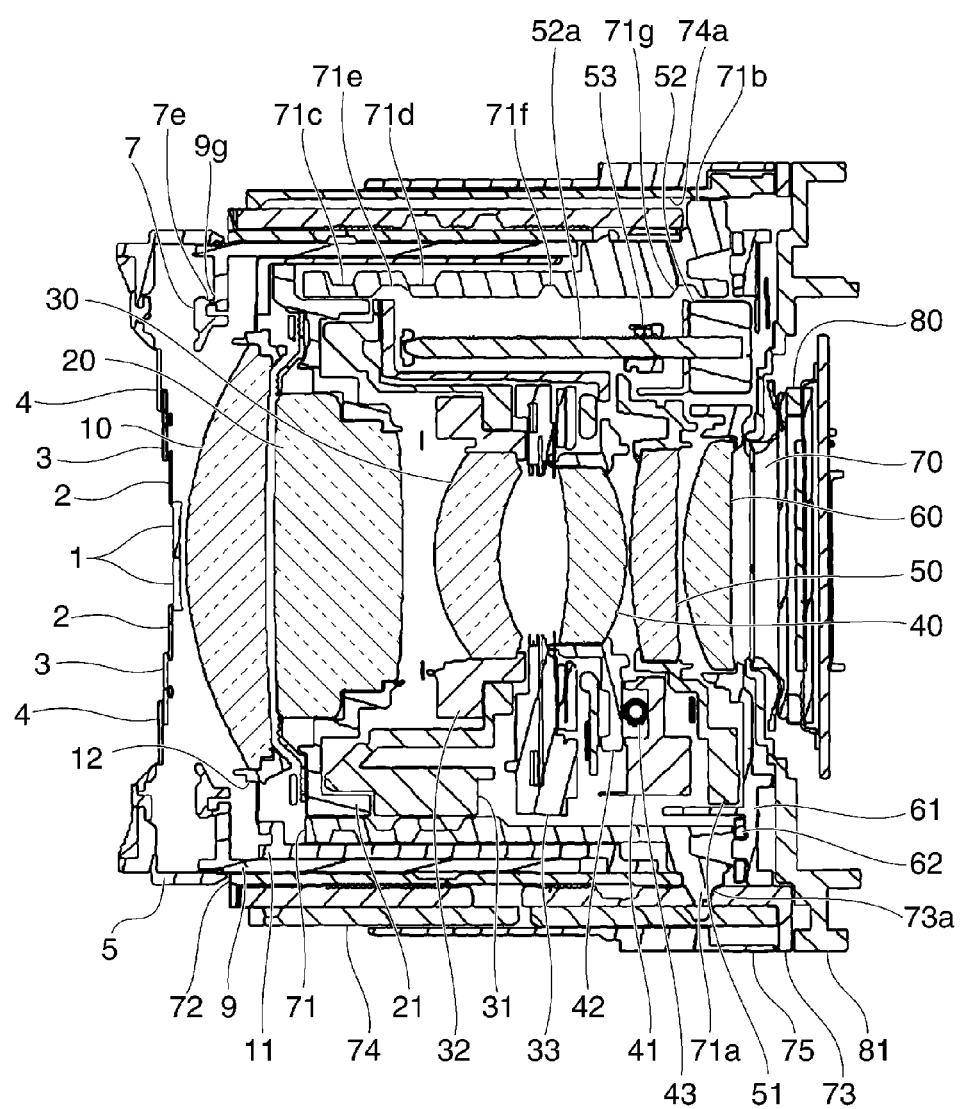
FIG. 3 is a sectional view showing the lens barrel in a collapsed position.

FIG. 2 is a sectional view showing the lens barrel 201 in the shooting position. FIG. 3 is a sectional view of the lens barrel 201 in the collapsed position.

As shown in FIG. 2 and FIG. 3, the lens barrel 201 has a barrier barrel 9, a first lens barrel 11, a second lens barrel 21, a third lens barrel 31, a fourth lens barrel 41, the fifth lens barrel 51, a sixth lens barrel 61, a moving cam barrel 71, a decorative barrel 72, a fixed barrel 73, a driving cam barrel 74, a cover barrel 75, and a device holder 81.

The barrier barrel 9 is arranged nearest to the subject side, and constitutes the barrier mechanism mentioned later. The barrier barrel 9 moves in an optical axis direction together with the first lens barrel 11 during a zoom operation. Moreover, a cam groove of which a cam locus relatively shifts the first lens barrel 11 with respect to the barrier barrel 9 in the optical axis direction only at the collapsed position is formed on the barrier barrel 9.

The first lens barrel 11 holds a first lens 10, and moves in the optical axis direction together with the first lens 10. A cam pin (not shown) is provided on an edge of an image surface side of an inner periphery of the first lens barrel 11. A first lens holding frame 12 to which the first lens 10 is fixed is incorporated into the first lens barrel 11 by adhesion etc., and a shading sheet 13 is attached to the first lens holding frame 12.

The second lens barrel 21 holds a second lens 20. A cam pin (not shown) provided on the second lens barrel 21 engages with a cam groove 71e of the moving cam barrel 71.

A third lens holding frame 32 to which the third lens 30 is fixed is incorporated into the third lens barrel 31 by adhesion etc. A cam pin (not shown) provided on the third lens barrel 31 engages with the cam groove 71e of the moving cam barrel 71. Moreover, the diaphragm-shutter unit 33 is attached to the third lens barrel 31.

The diaphragm-shutter unit 33 is electrically connected to a control substrate (not shown) through a flexible substrate (not shown). The diaphragm-shutter unit 33 has four shutter blades at the subject side, and has nine diaphragm blades at the image surface side. The four shutter blades open and close by electromagnetism drive, and control an exposure amount of the image pickup device 80. Moreover, the nine diaphragm blades open and close by a motor (not shown), and changes the aperture diameter to adjust a light amount.

The fourth lens barrel 41 holds a fourth lens holding frame 42 holding a fourth lens 40 so as to allow a shift of the fourth lens holding frame 42 in a direction that intersects perpendicularly with the optical axis. The fourth lens holding frame 42 holds two magnets (not shown) at positions of which phases differ about 90 degrees mutually in a circumferential direction. Moreover, the fourth lens holding frame 42 is pushed to the fourth lens barrel 41 in the optical axis direction with energization force of springs (not shown) in between three balls 43. The fourth lens barrel 41 is provided with a cam pin (not shown), and the cam pin is engaged with a cam groove 71f formed on the inner periphery of the moving cam barrel 71.

Moreover, coils (not shown) and Hall elements (not shown) are arranged on the fourth lens barrel 41 at the positions that sandwich the above-mentioned two magnets. When electric currents are applied to the coils through the flexible substrate (not shown), the fourth lens holding frame 42 shifts in a direction that intersects perpendicularly with the optical axis according to the electromagnetic forces that are generated between the coils and the magnets.

The fourth lens holding frame 42 is guided in a direction that intersects perpendicularly with the optical axis through rolling of the balls 43 at this time. Since the Hall elements output signals according to position changes of the magnets held on the fourth lens holding frame 42, the shift amount of the fourth lens holding frame 42 is detected on the basis of the signals.

The fifth lens barrel 51 holds a fifth lens 50. The fifth lens barrel 51 is supported by two guide bars (not shown) fixed to the sixth lens barrel 61 so as to be movable in the optical axis direction. A screw 52a is formed on an output shaft of an AF motor 52, and a rack 53 fixed to the fifth lens barrel 51 is meshed with the screw 52a. Accordingly, the rotation of the AF motor 52 moves the fifth lens barrel 51 in the optical axis direction by a screw operation between the screw 52a and the rack 53.

The sixth lens barrel 61 holds a sixth lens 60. The sixth lens barrel 61 is provided with a cam pin (not shown), and the cam pin is engaged with a cam groove 74b formed on the inner periphery of the driving cam barrel 74. A rectilinear key 62 is provided in the sixth lens barrel 61. Moreover, a key part (not shown) is formed on an edge of the image surface side of the outer periphery of the sixth lens barrel 61, and the key part is engaged with a rectilinear groove (not shown) formed on the inner periphery of the fixed barrel 73. Accordingly, the sixth lens barrel 61 and the rectilinear key 62 are movable along with the rectilinear groove in the optical axis direction while the rotation with respect to the fixed barrel 73 is regulated.

The device holder 81 holds the image pickup device 80. An IR cut filter 70 is arranged at the subject side of the image pickup device 80. An image pickup unit containing the IR cut filter 70 and the image pickup device 80 is fixed to the device holder 81 with screws (not shown).

A lever driving groove 71h (see FIG. 20) and a cam groove 71d are formed on the outer periphery of the moving cam barrel 71, and cam grooves 71e, 71f, and 71g are formed on the inner periphery thereof. Moreover, cam pins 71a, drive pins 71b, and a hook 71i (see FIG. 20) are provided in the moving cam barrel 71.

The decorative barrel 72 is integrally attached to the moving cam barrel 71 at the outer peripheral side of the barrier barrel 9 and the first lens barrel 11, and covers the moving cam barrel 71 so that the cam pins, the cam grooves, etc. of the moving cam barrel 71 cannot be seen from the outside.

A cam groove 73a is formed on the inner periphery of the fixed barrel 73, and the cam pin 71a of the moving cam barrel 71 is engaged with the cam groove 73a.

The driving cam barrel 74 is provided in the outer peripheral side of the fixed barrel 73 pivotable. A gear part (not shown) is formed integrally on the outer periphery of the driving cam barrel 74. The gear part is connected to a PZ motor (not shown) through a deceleration mechanism (not shown). The cam groove 74b with which the cam pin of the sixth lens barrel 61 is engaged is formed on the inner periphery of the driving cam barrel 74. Accordingly, the rotation of the driving cam barrel 74 moves the sixth lens barrel 61 in the optical axis direction along the cam groove 74b.

Next, operations of the lens barrel 201 will be described.

The driving cam barrel 74 rotates by driving the PZ motor. A groove 74a extended in the optical axis direction is formed on the inner periphery of the driving cam barrel 74, and the drive pin 71b of the moving cam barrel 71 is engaged with the groove 74a. Accordingly, the rotation of the driving cam barrel 74 rotates the moving cam barrel 71. Since the cam pin 71a is engaged with the cam groove 73a of the fixed barrel 73, the moving cam barrel 71 moves in the optical axis direction while rotating.

When the moving cam barrel 71 rotates, the cam pin (not shown) on the inner periphery of the first lens barrel 11 receives driving force in the optical axis direction by the lift of the cam groove 71d on the outer periphery of the moving cam barrel 71. In this case, a rectilinear groove (not shown) formed on the first lens barrel 11 moves along a rectilinear key (not shown) provided on the second lens barrel 21.

Moreover, a rectilinear groove (not shown) that is engaged with a rectilinear key (not shown) of the barrier barrel 9 is formed on the first lens barrel 11. The cam pin 9a (see FIG. 5) of the barrier barrel 9 receives driving force in the optical axis direction by the lift of the cam groove 71c on the outer periphery of the moving cam barrel 71. Accordingly, when the moving cam barrel 71 rotates, the first lens barrel 11 and the barrier barrel 9 are movable in the optical axis direction without rotating.

Furthermore, when the moving cam barrel 71 rotates, the second lens barrel 21, the third lens barrel 31, and the fourth lens barrel 41 move in the optical axis direction by the lifts of the cam grooves 71e, 71f, and 71g. At this time, a linear-guide mechanism (not shown) with the rectilinear key 62 regulates the rotations of the second lens barrel 21, the third lens barrel 31, and the fourth lens barrel 41.

Thus, the lens barrel 201 extends to a wide end of the shooting position from the collapsed position, and can perform zooming between the wide end and a telephoto end. Moreover, focusing is performed by moving the fifth lens barrel 51 in the optical axis direction with the AF motor 52.

Next, the barrier mechanism provided on the lens barrel 201 will be described with reference to FIG. 4 through FIG. 22.

Figure 4:
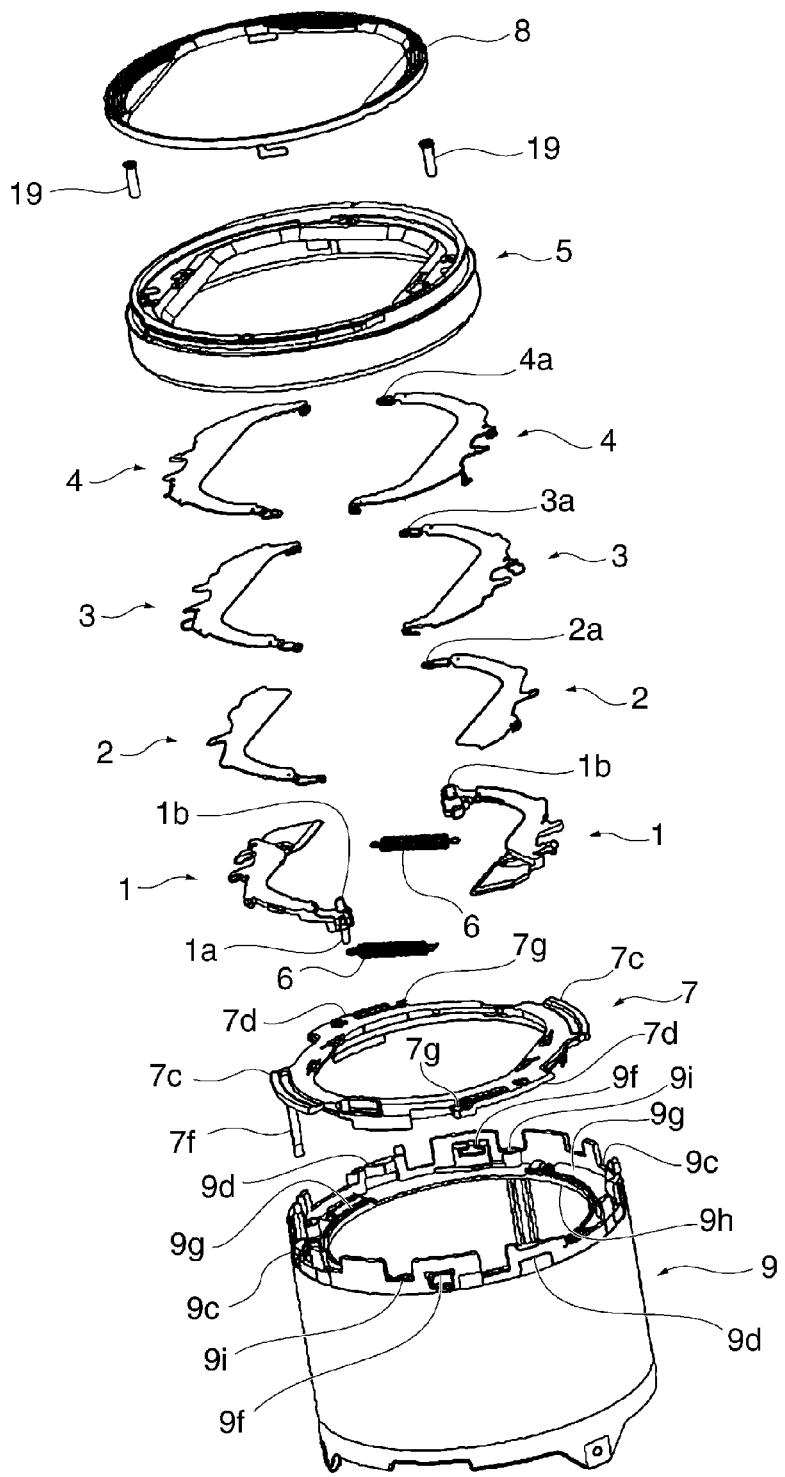
FIG. 4 is an exploded perspective view showing a barrier mechanism of the camera shown in FIG. 1 viewed from the subject side.
Figure 5:
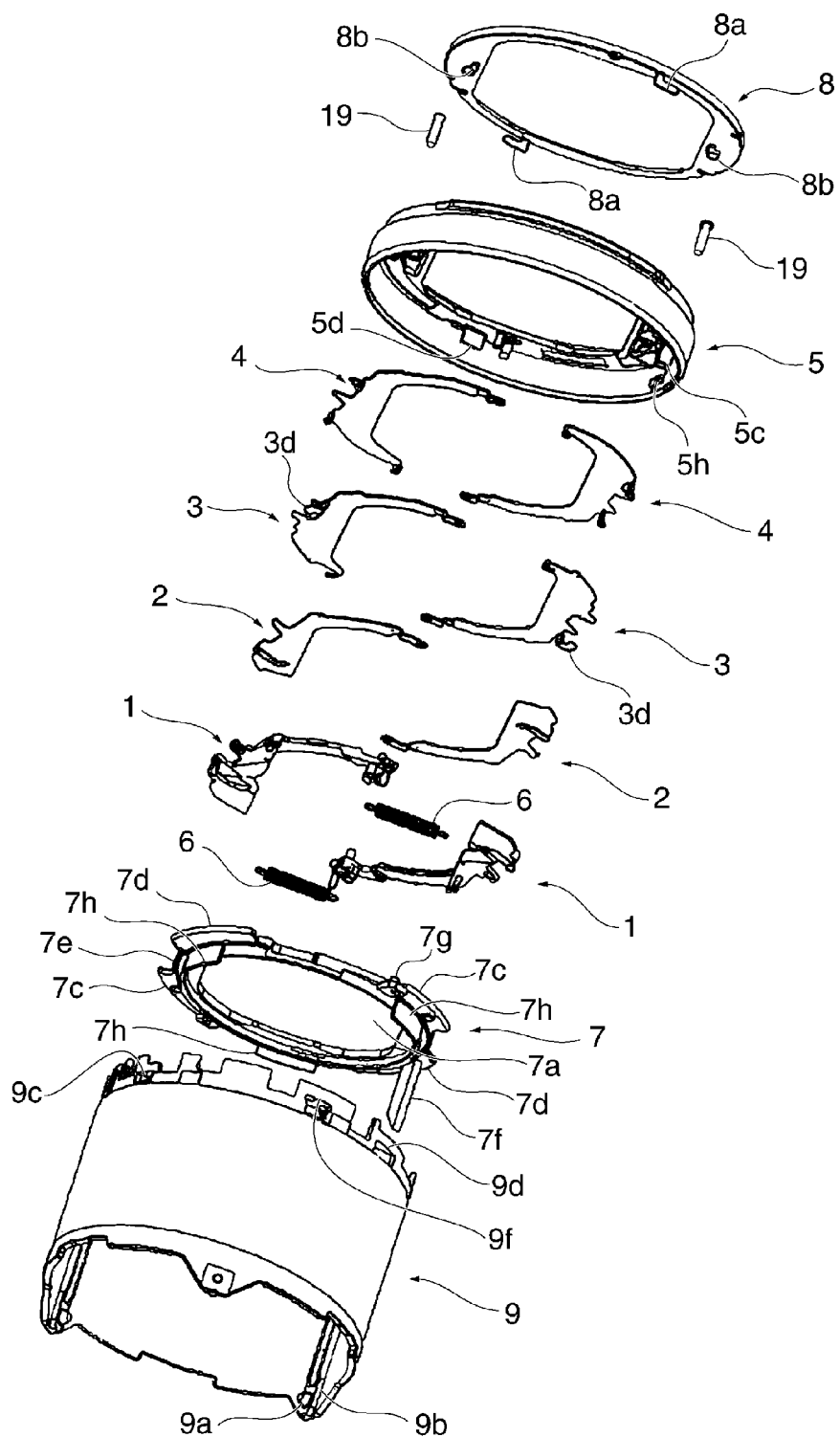
FIG. 5 is an exploded perspective view showing the barrier mechanism viewed from an image surface side.

FIG. 4 is an exploded perspective view showing the barrier mechanism viewed from a subject side. FIG. 5 is an exploded perspective view showing the barrier mechanism viewed from an image surface side.

As shown in FIG. 4 and FIG. 5, the barrier mechanism has four pairs of barrier blades 1 through 4, a barrier cover 5, a pair of coil springs 6, a barrier driving ring 7, a decorative ring 8, and a barrier barrel 9.

Each pair of the barrier blades 1 through 4 make a group. Each pair of the barrier blades 1 through 4 are rotatable in mutually opposite directions, and cover an opening part 5a of the barrier cover 5 openably and closably.

Moreover, the barrier blades 1 is made from resin material, and the barrier blades 2 through 4 are made from metal material. The barrier blades 1 through 4 are arranged in piles in the optical axis direction in an open state. The barrier cover 5, the barrier driving ring 7, the decorative ring 8, and the barrier barrel 9 are made from resin material, respectively, and the barrier cover 5 is fixed to the barrier barrel 9 with screws 19. The barrier blades 1, the barrier blades 2, the barrier blades 3, and the barrier blade 4 are equivalent to examples of the first barrier blades, the second barrier blades, the third barrier blades, and the fourth barrier blades of the present invention, respectively.

Figure 6:
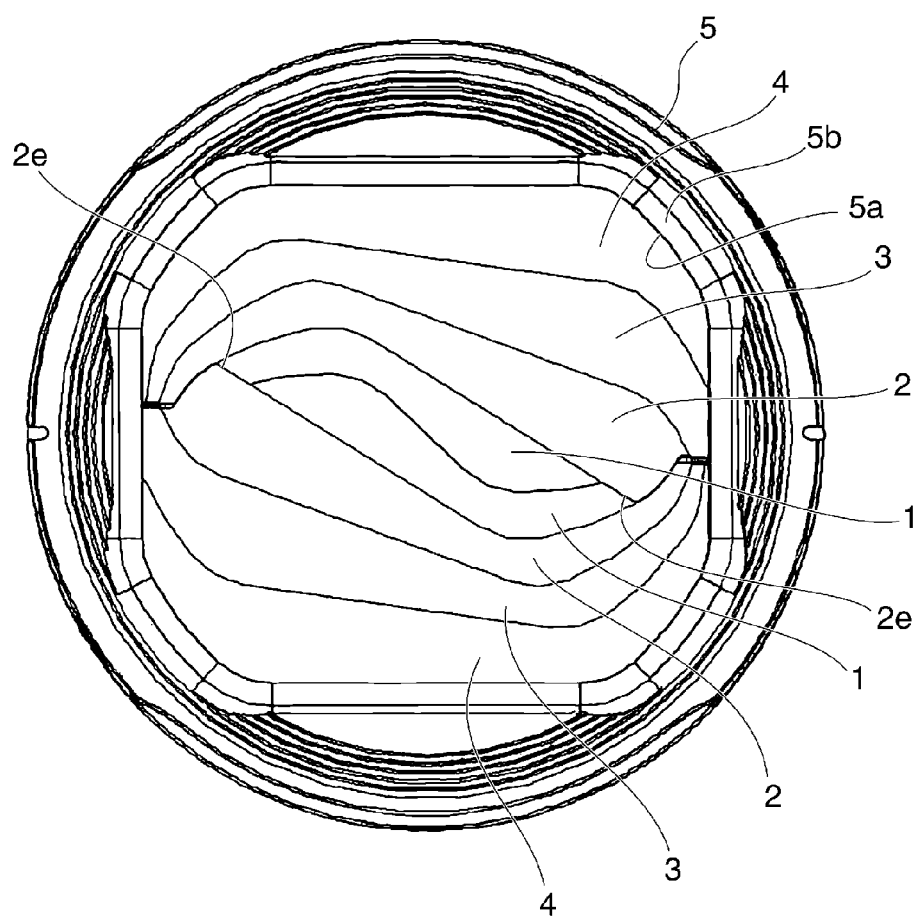
FIG. 6 is a view showing the barrier mechanism in a case where barrier blades are in a closed state viewed from the subject side.
Figure 7:
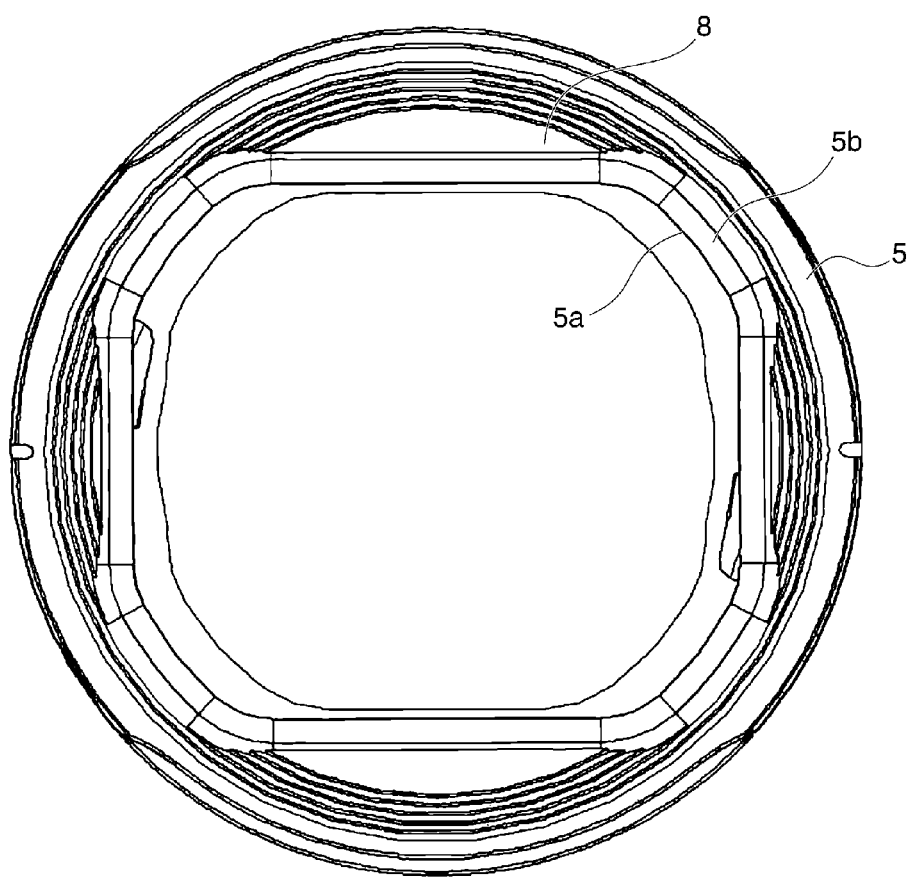
FIG. 7 is a view showing the barrier mechanism in a case where the barrier blades are in an opened state viewed from the subject side.
Figure 8:
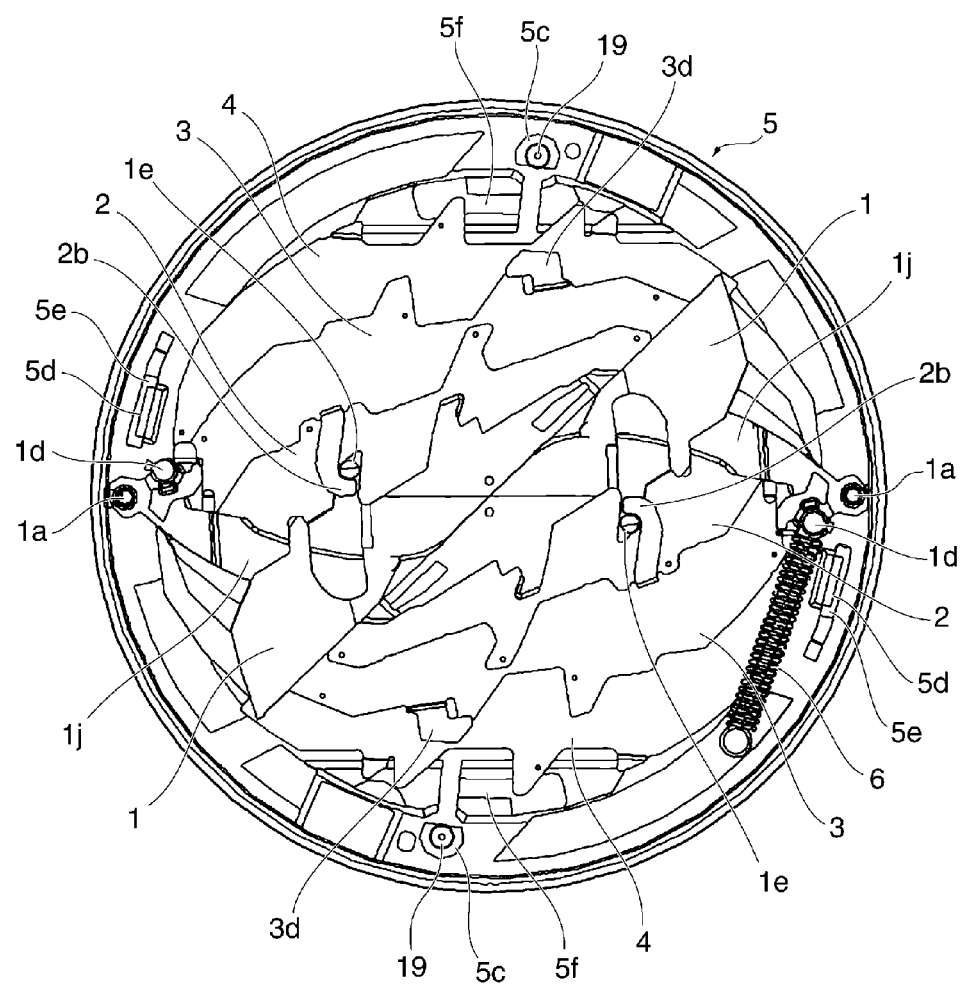
FIG. 8 is a view showing the barrier mechanism in the case where the barrier blades are in the closed state viewed from the image surface side.
Figure 9:
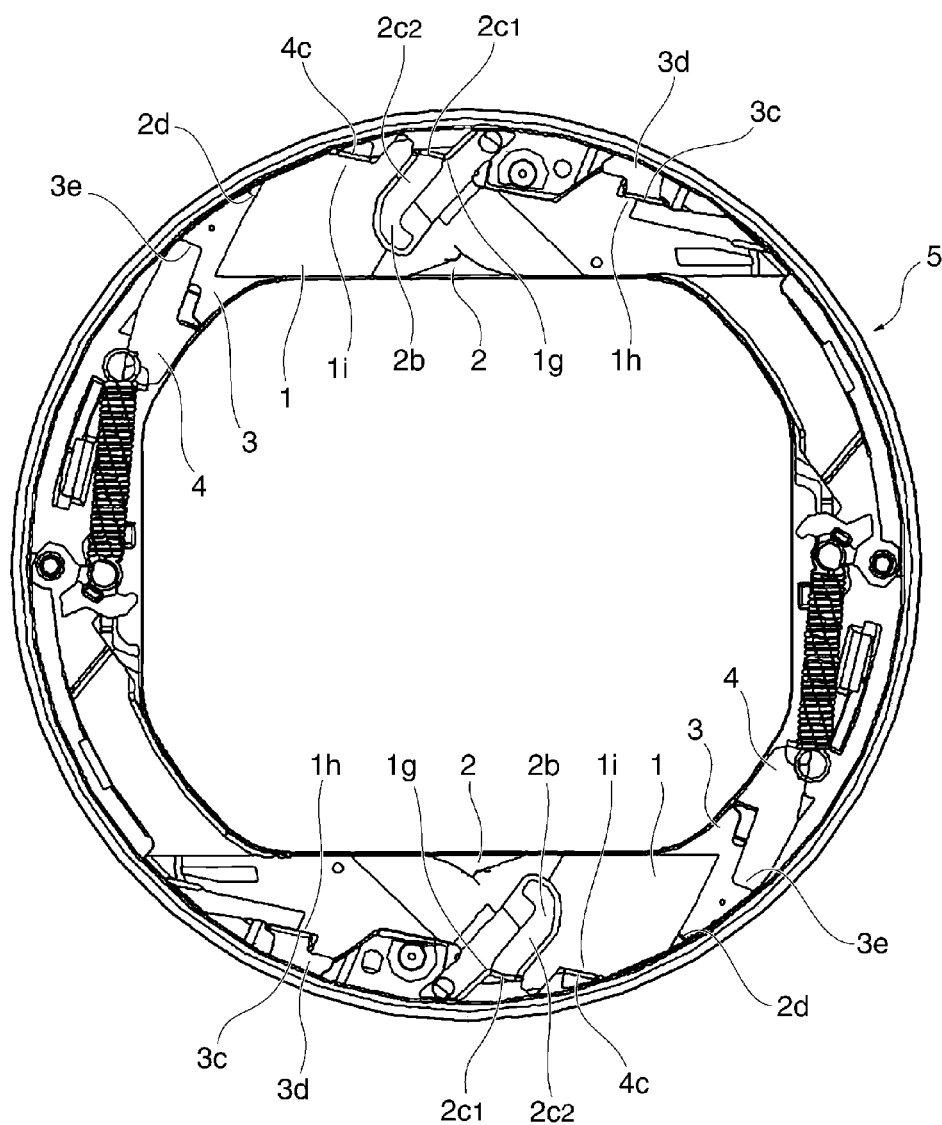
FIG. 9 is a view showing the barrier mechanism in the case where the barrier blades are in the opened state viewed from the image surface side.

FIG. 6 is a view showing the barrier mechanism in a case where the barrier blades 1 through 4 are in a closed state viewed from the subject side. FIG. 7 is a view showing the barrier mechanism in a case where the barrier blades 1 through 4 are in an opened state viewed from the subject side. FIG. 8 is a view showing the barrier mechanism in the case where the barrier blades 1 through 4 are in the closed state viewed from the image surface side. FIG. 9 is a view showing the barrier mechanism in the case where the barrier blades 1 through 4 are in the opened state viewed from the image surface side. It should be noted that the barrier driving ring 7 and the barrier barrel 9 are not shown in FIG. 8 and FIG. 9.

Figure 10:
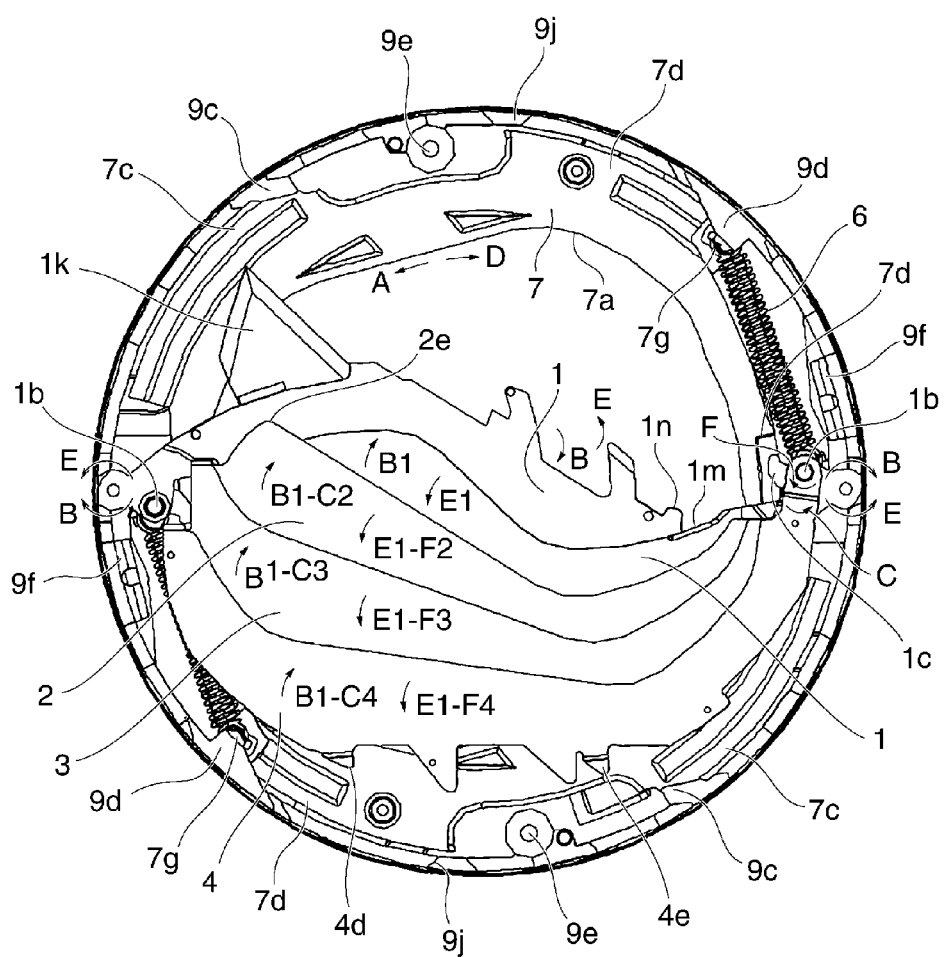
FIG. 10 is a view showing the barrier mechanism in the case where the barrier blades are in the closed state and where a barrier cover and the three barrier blades at the upper side in the drawing are removed viewed from the subject side.
Figure 11:
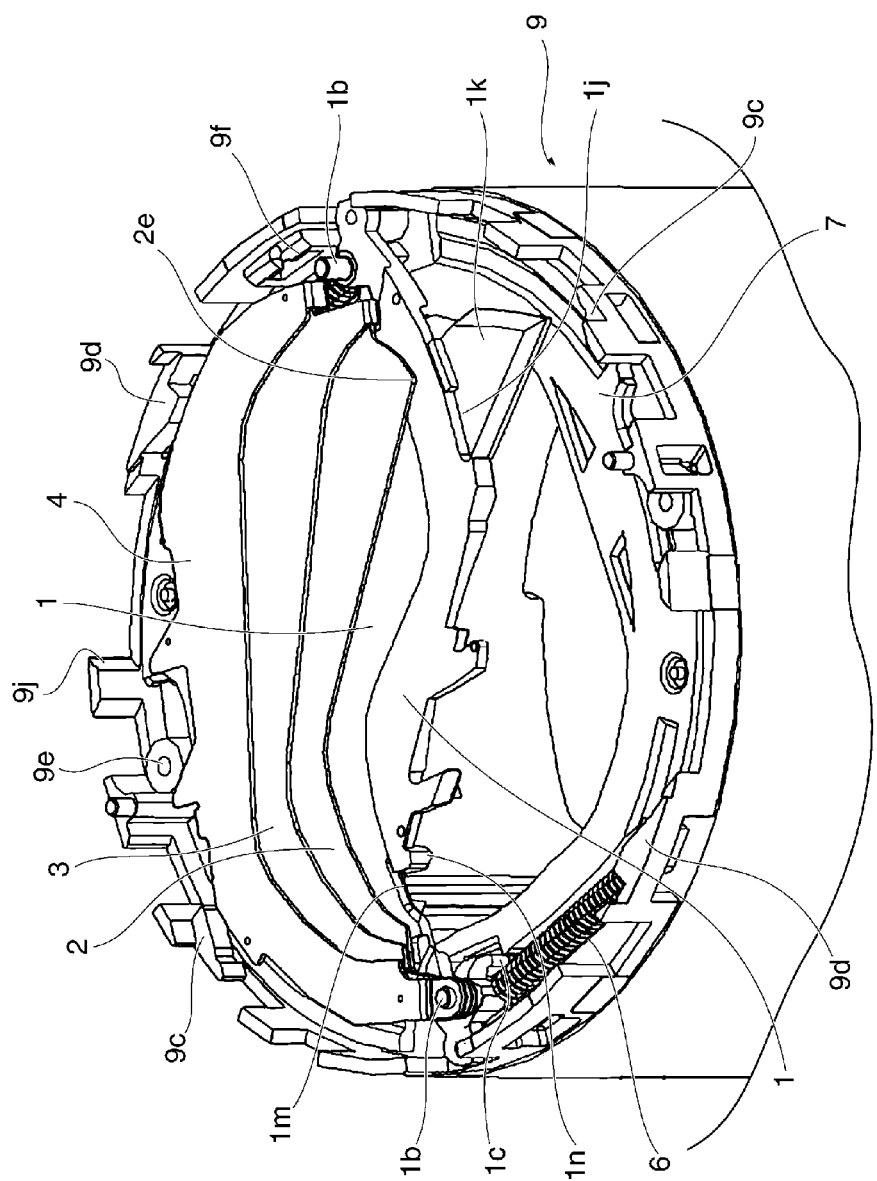
FIG. 11 is a perspective view showing the barrier mechanism in the state shown in FIG. 10.
Figure 12:
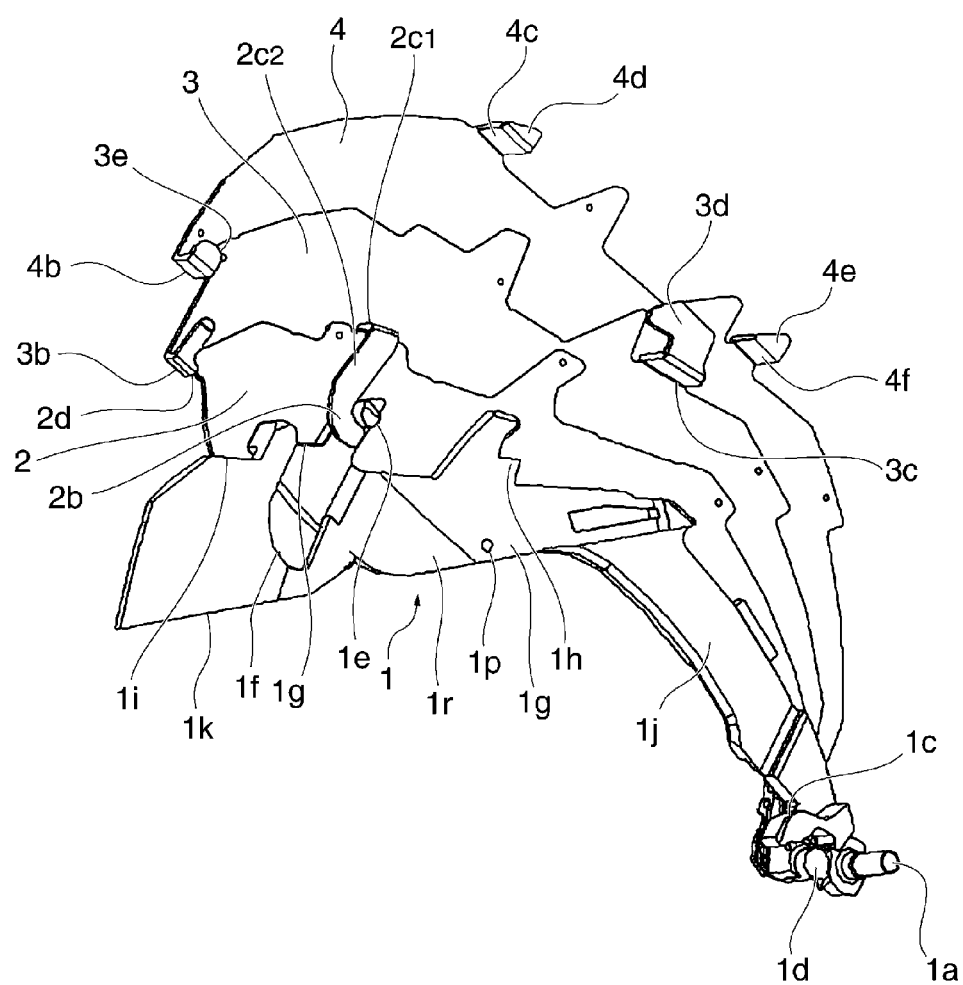
FIG. 12 is a perspective view showing the four barrier blades of the upper set in the barrier mechanism in the closed state.
Figure 13:
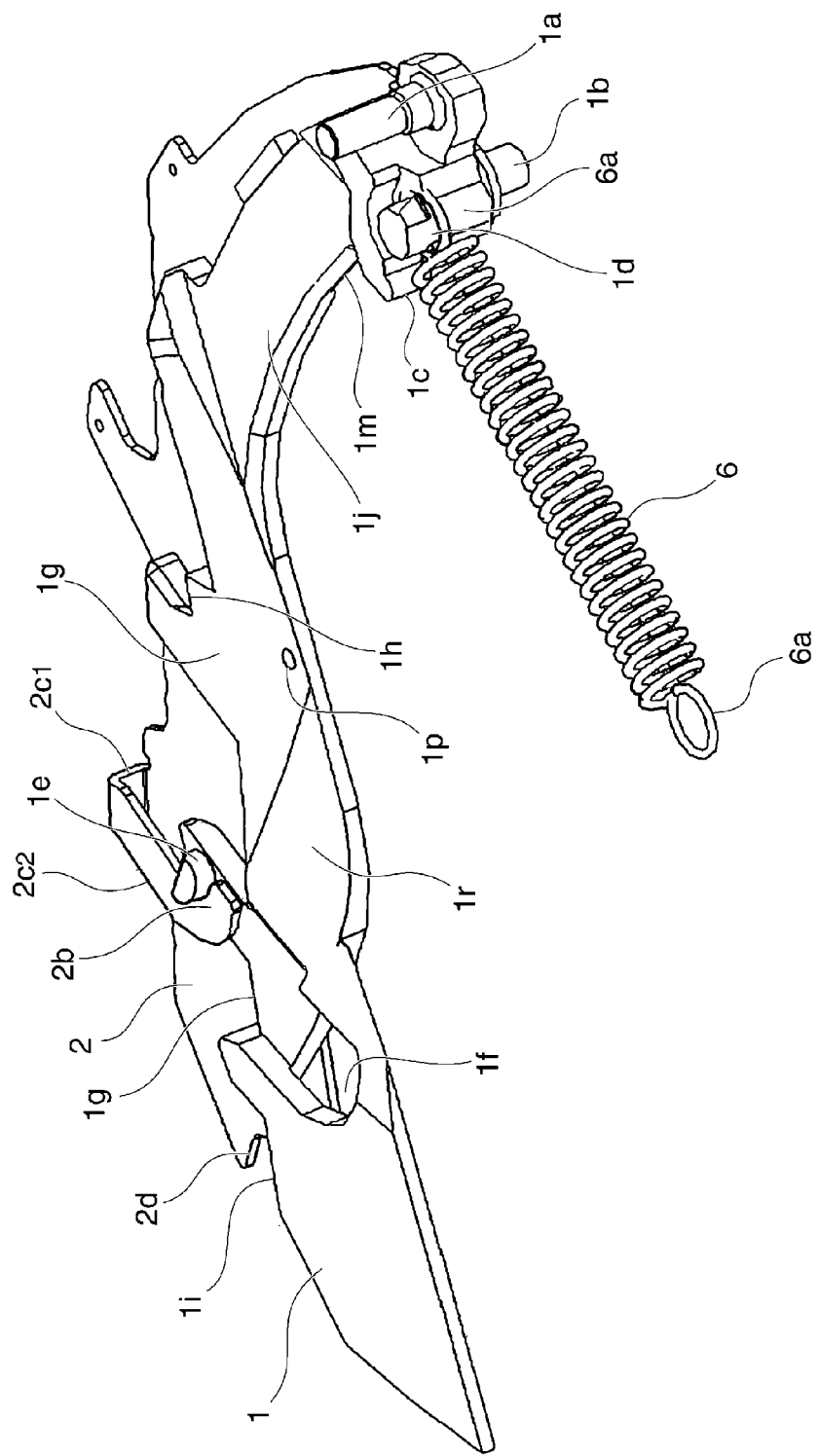
FIG. 13 is a perspective view showing a relationship between the barrier blade made from resin and the barrier blade made from metal in the barrier mechanism in the closed state.
Figure 14:
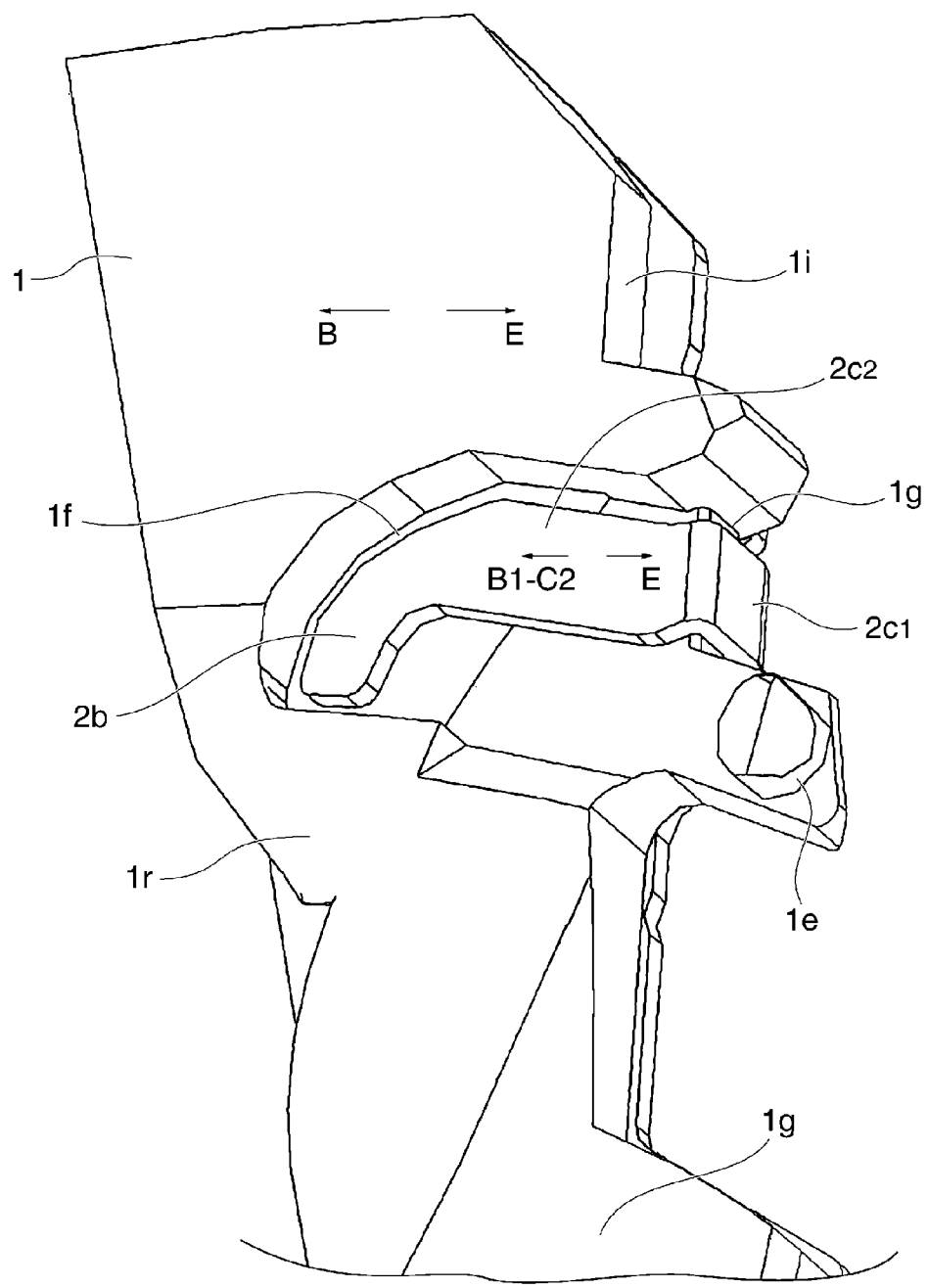
FIG. 14 is a perspective view showing the relationship between the barrier blade made from resin and the barrier blade made from metal in the barrier mechanism in the opened state.
Figure 15:
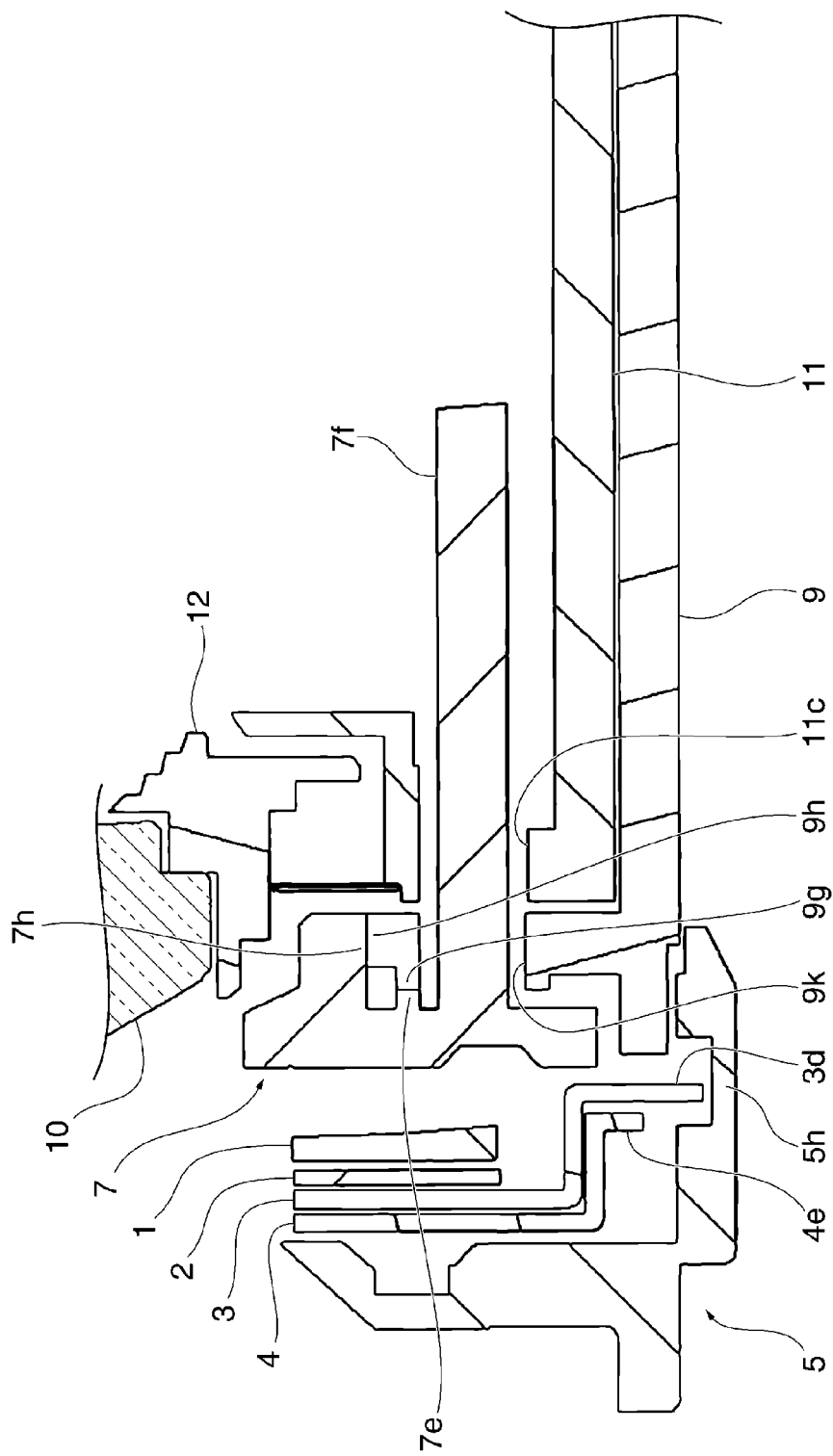
FIG. 15 is a partial expanded sectional view showing the barrier mechanism.
Figure 16:
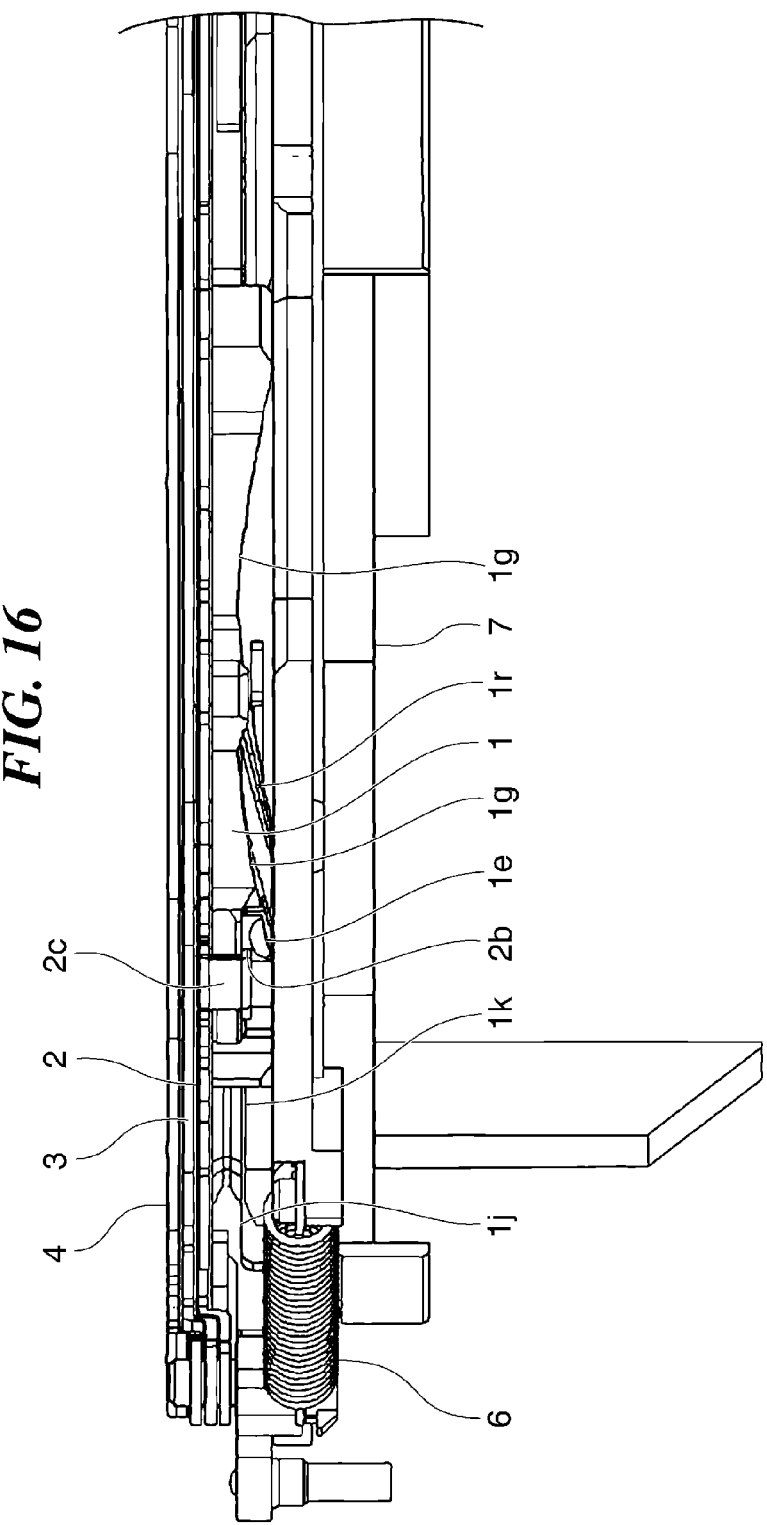
FIG. 16 is a side view showing the barrier mechanism in the case where the barrier blades are in the closed state.

FIG. 10 is a view showing the barrier mechanism in the case where the barrier blades 1 through 4 are in the closed state and where a barrier cover 5 and the three barrier blades 2 through 4 at the upper side in the drawing are removed viewed from the subject side. FIG. 11 is a perspective view showing the barrier mechanism in the state shown in FIG. 10. FIG. 12 is a perspective view showing the four barrier blades 1 through 4 of the upper set in the barrier mechanism in the closed state. FIG. 13 is a perspective view showing the relationship between the barrier blade 1 and the barrier blade 2 in the closed state. FIG. 14 is a perspective view showing the relationship between the barrier blade 1 and the barrier blade 2 in the opened state. FIG. 15 is a partial expanded sectional view showing the barrier mechanism. FIG. 16 is a side view showing the barrier mechanism in the case where the barrier blades 1 through 4 are in the closed state.

As shown in FIG. 4, FIG. 5, and FIG. 10, two flanges 7c projected outward in the radial direction are provided on the barrier driving ring 7 at positions apart by 180 degrees in the circumferential direction. Moreover, two flanges 7d projected inward in the radial direction are provided on the barrier driving ring 7 at positions apart by 180 degrees in the circumferential direction where phases are different from the flanges 7c by 90 degrees.

The barrier barrel 9 is arranged at the outer peripheral side of the barrier driving ring 7, and bayonet hooks 9c and 9d are provided at the positions corresponding to the flanges 7c and 7*d* of the barrier driving ring 7, respectively. The subject side position of the barrier driving ring 7 with respect to the barrier barrel 9 in the optical axis direction is determined by means of the bayonet connections between the flanges 7*c* and 7*d* of the barrier driving ring 7 and the bayonet hooks 9*c* and 9*d* of the barrier barrel 9.

Moreover, as shown in FIG. 15, the image surface side position of the barrier driving ring 7 with respect to the barrier barrel 9 in the optical axis direction is determined because an image surface side of a rail 7*e* of the barrier driving ring 7 contacts with a subject side of a rail 9*g* of the barrier barrel 9 in the optical axis direction. As shown in FIG. 4, FIG. 5, and FIG. 15, three projections 7*h* projected to the image surface side are formed on the barrier driving ring 7 at nearly regular intervals in the circumferential direction. The projections 7*h* are inserted into arc-shaped grooves 9*h*, which are formed on the barrier barrel 9 corresponding to the projections 7*h*, in the radial direction, and contact with inner circumferential surfaces of the arc-shaped grooves 9*h*. Accordingly, the barrier driving ring 7 is held rotatably by the barrier barrel 9.

The barrier cover 5 is formed so that the diameter thereof is larger than that of the barrier barrel 9. As shown in FIG. 6 and FIG. 7, the barrier cover 5 has the opening part 5*a* corresponding to an effective aperture area (an area in which a beam effective in an image pick-up enters) at the subject side of the first lens 10, and a shading part 5*b* formed in the outside area of the opening part 5 in the radial direction. The opening part 5*a* is formed in a rectangular shape. As mentioned above, the opening part is closed with the barrier blades 1 through 4 in the closed state, and is opened in the opened state of the barrier blades 1 through 4. When the opening part 5*a* is closed with the barrier blades 1 through 4 in the closed state, the subject side of the first lens 10 is covered and protected.

As shown in FIG. 8, two holes 5*c* are provided on the barrier cover 5 at positions apart by 180 degrees in the circumferential direction. Moreover, two hooks 5*d* are provided on the barrier cover 5 at positions apart by 180 degrees in the circumferential direction where phases are different from the holes 5*c* by 90 degrees.

The barrier blades 1 through 4 are stored at the positions that overlap in the optical axis direction mutually in the opened state of the barrier blades 1 through 4 shown in FIG. 7 and FIG. 9. A shaft 1*a* is provided on the image surface side in the proximal part of the barrier blade 1 that is made from resin material, and a shaft 1*b* is provided on the subject side thereof. As shown in FIG. 13, the shaft 1*a* and the shaft 1*b* are arranged in parallel but are not coaxial. The shaft 1*a* at the image surface side of the barrier blade 1 is inserted into a hole 9*i* (see FIG. 4) formed in the barrier barrel 9. The shaft 1*b* at the subject side is inserted into a hole 2*a* (see FIG. 4) formed in the barrier blade 2. Here, the shaft 1*a* is an example of the first shaft of the present invention, and the shaft 1*b* is an example of the second shaft of the present invention. Moreover, the first barrier blade 1 is equivalent to an example of the main barrier blade of the present invention, and the barrier blades 2 through 4 are equivalent to examples of the auxiliary barrier blades of the present invention.

Similarly the shaft 1*b* at the subject side of the barrier blade 1 is inserted also into a hole 3*a* formed in the barrier blade 3, and a hole 4*a* formed in the barrier blade 4 in order. Accordingly, the barrier blade 1 is rotatably supported on the shaft (rotation shaft) 1*a* in an opening-and-closing direction (a direction of an arrow B or E in FIG. 10), and the barrier blades 2 through 4 are rotatably supported on the shaft 1*b* in an opening-and-closing direction (a direction of an arrow C or F in FIG. 10). Here, since the shaft 1*a* at the image surface side and the shaft 1*b* at the subject side of the barrier blade 1 are not coaxial, the rotation of the barrier blade 1 around the shaft 1*a* moves the shaft 1*b* that is the rotation center of the barrier blades 2 through 4 (revolution).

As shown in FIG. 11, FIG. 12, and FIG. 16, a distal difference depression 1*k* and a proximal difference depression 1*j* are formed in a distal end and a proximal end of the barrier blade 1, respectively. The distal difference depression 1*k* of the barrier blade 1 is formed facing the subject side, and the proximal difference depression 1*j* is formed facing the image surface side.

Then, when the pair of barrier blades 1 are in the closed state, the distal difference depression 1*k* of one (the other) barrier blade is inserted into the proximal difference depression 1*j* of the other (one) barrier blade 1 in the rotational direction so that the distal difference depression 1*k* and the proximal difference depression 1*j* are arranged facing mutually in the optical axis direction. At this time, the surfaces of the pair of barrier blades 1 are arranged in the same plane.

As shown in FIG. 11, an introduction part 1*m* is formed in the inner peripheral side in the opening-and-closing direction of the proximal end of the barrier blade 1 by chamfering etc. Moreover, a running-on part 2*e* is formed on the distal end of the barrier blade 2 that faces the barrier blade 1 in the opening-and-closing direction. The running-on part 2*e* runs on the subject side face of the barrier blade 1 through the introduction part 1*m* and overlaps to the barrier blade 1 in the optical axis direction in the closed state of the barrier blades 1 and 2. Accordingly, even when the heights of the pair of barrier blades 1 differ in the optical axis direction due to rattling etc. in the opened state, the heights of the pair of barrier blades 1 will be matched in the closed state because the running-on parts 2*e* of the barrier blades 2 run on the subject side faces of the pair of barrier blades 1.

As shown in FIG. 12, a bending part 3*c* that is bended to the image surface side is formed on the outer peripheral side in the opening-and-closing direction of the barrier blade 3. A projecting part 3*d* that projects in the opening direction of the barrier blade 3 is formed at the tip end of the bending part 3*c*. Moreover, two bending parts 4*c* and 4*f* that are bended to the image surface side are formed on the outer peripheral side in the opening-and-closing direction of the barrier blade 4. Projecting parts 4*d* and 4*e* that project in the opening direction of the barrier blade 4 are formed at the tip ends of the bending parts 4*c* and 4*f*. The projecting part 3*d* is equivalent to an example of the first projecting part of the present invention, and the projecting parts 4*d* and 4*e* are equivalent to examples of the second projecting part of the present invention.

As shown in FIG. 5 and FIG. 15, a lateral groove 5*h* is formed on the inner periphery of the barrier cover 5. The projecting part 3*d* of the barrier blade 3 is inserted into the lateral groove 5*h* in the radial direction in the opened state. Moreover, as shown in FIG. 15, the projecting part 3*d* of the barrier blade 3 and the projecting part 4*e* of the barrier blade 4 overlap in the optical axis direction in the opened state of the barrier blades 3 and 4.

Figure 17:
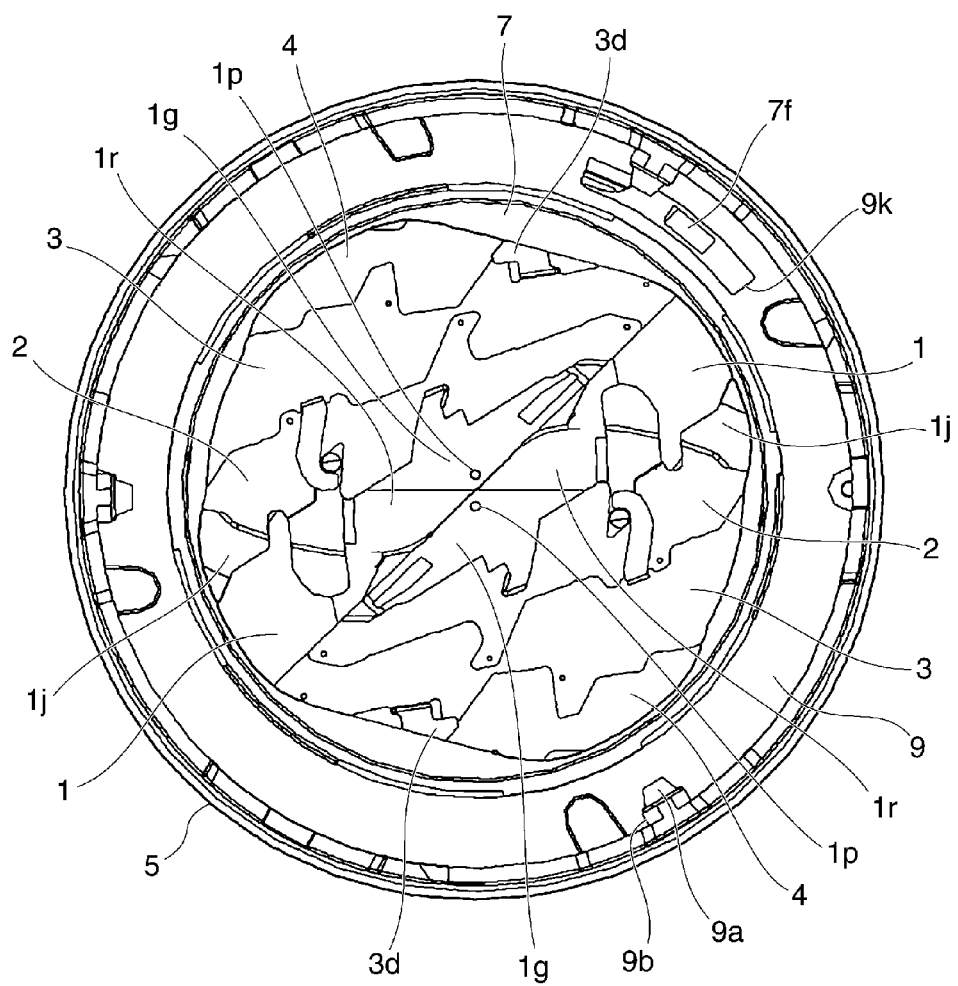
FIG. 17 is a view showing the barrier mechanism in the case where the barrier blades are in the closed state viewed from the image surface side.
Figure 18:
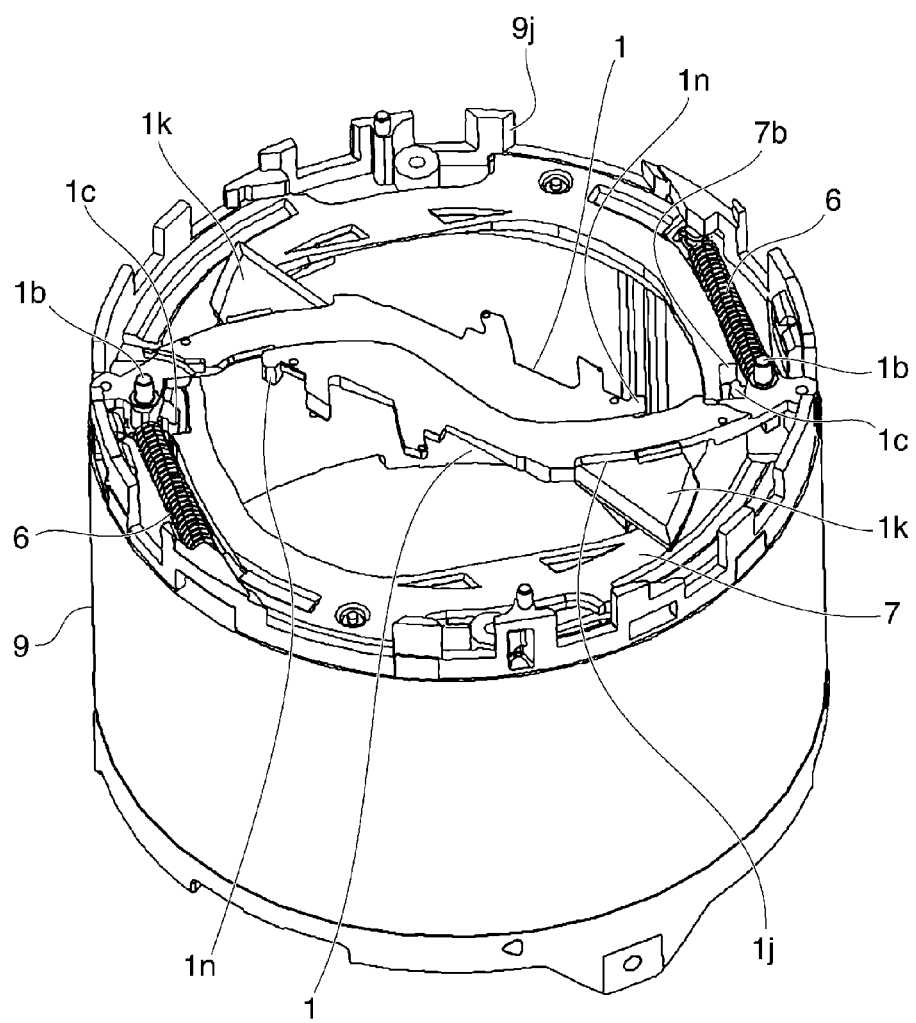
FIG. 18 is a perspective view showing the barrier mechanism in the case where the barrier blades are in the closed state viewed from the subject side.
Figure 19:
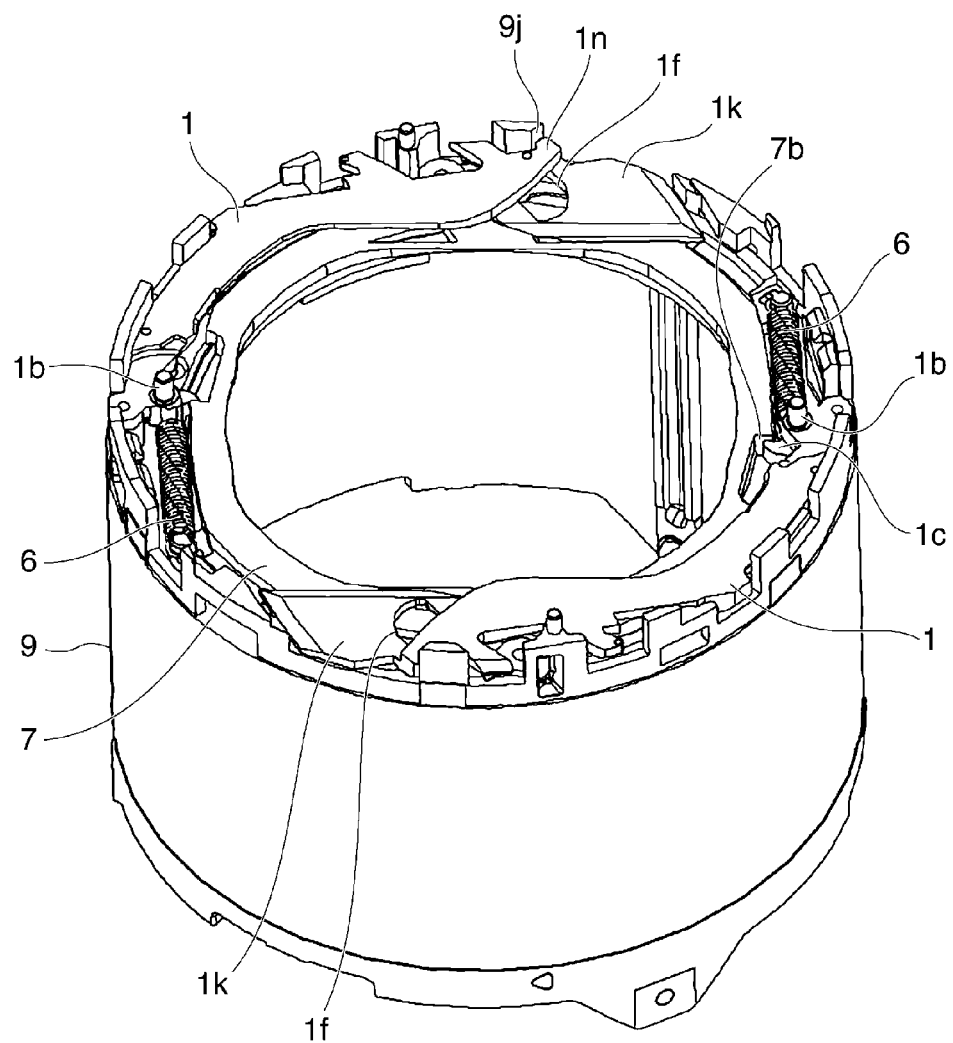
FIG. 19 is a perspective view showing the barrier mechanism in the case where the barrier blades are in the opened state viewed from the subject side.

FIG. 17 is a view showing the barrier mechanism in the case where the barrier blades 1 through 4 are in the closed state viewed from the image surface side. FIG. 18 is a perspective view showing the barrier mechanism in the case where the barrier blades 1 are in the closed state viewed from the subject side. FIG. 19 is a perspective view showing the barrier mechanism in the case where the barrier blades 1 are in the opened state viewed from the subject side. FIG.

Figure 21:
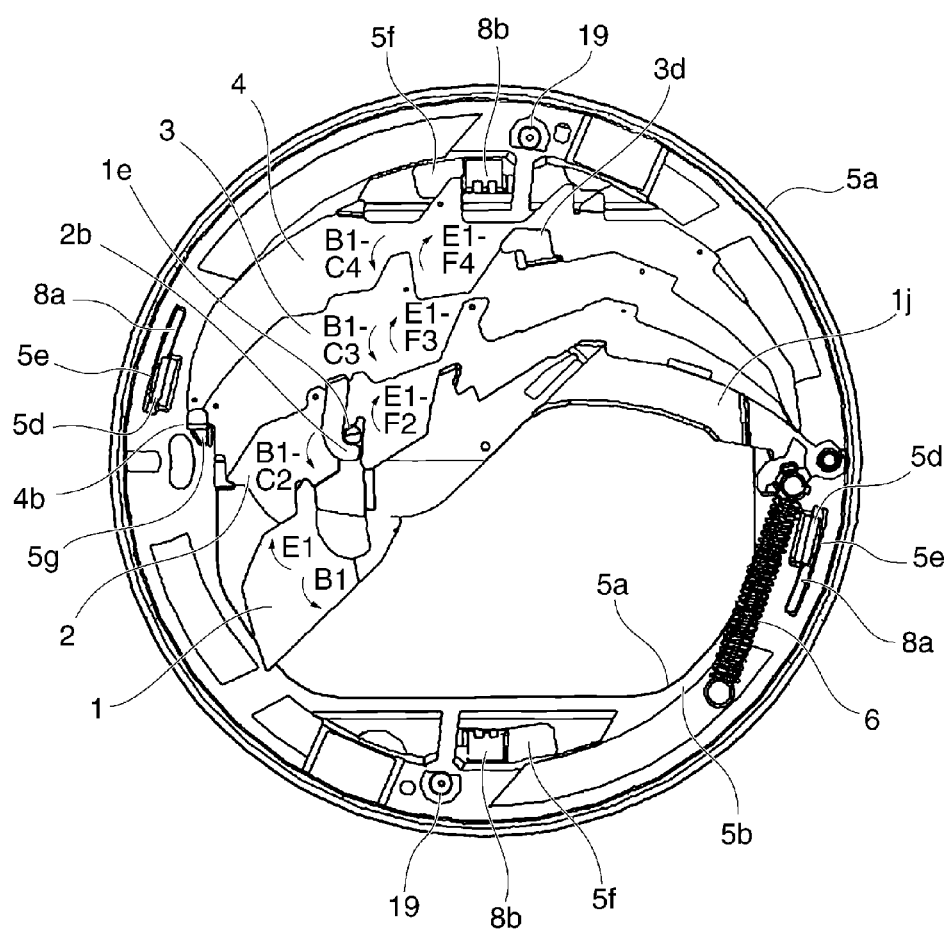
FIG. 21 is a view showing the barrier mechanism in the case where the barrier blades are in the closed state and where the four barrier blades of the lower set are removed viewed from the image surface side.
Figure 22:
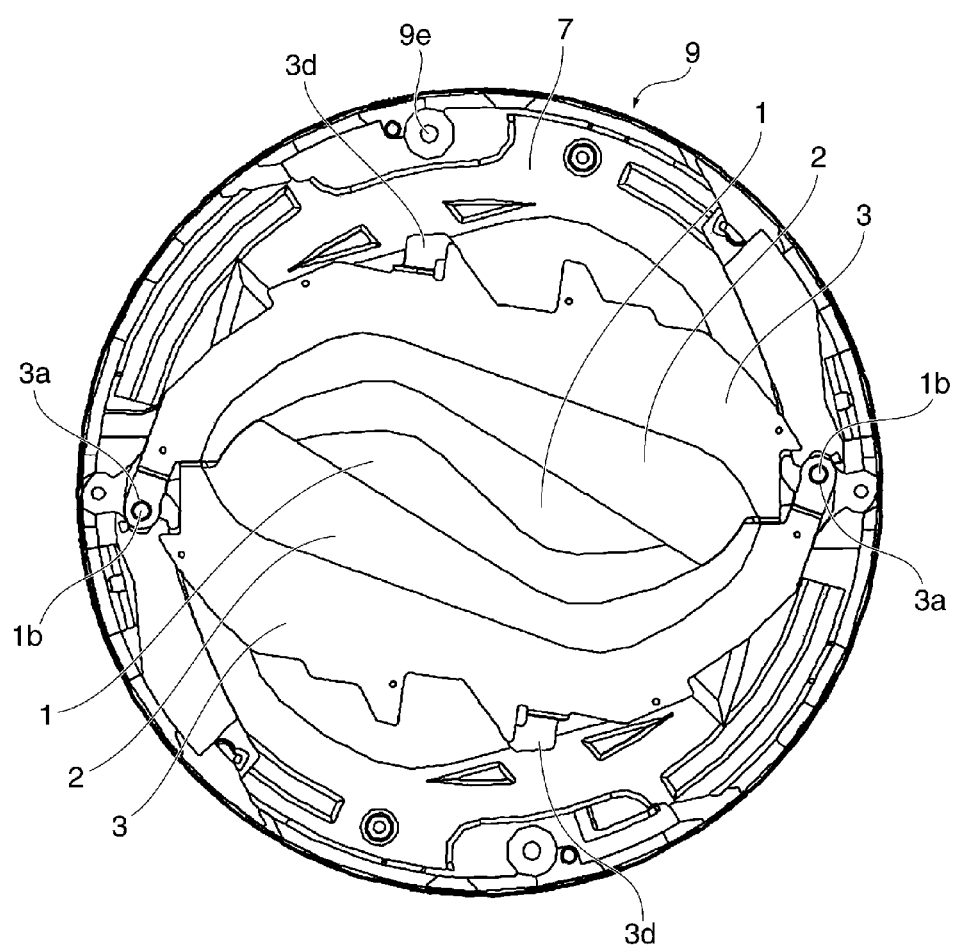
FIG. 22 is a view showing the barrier mechanism in the case where the barrier blades are in the closed state and where the barrier cover and a pair of the barrier blades covering the outmost areas are removed viewed from the subject side.

20 is a sectional view showing a relation between the moving cam barrel 71 and the barrier driving ring 7. FIG. 21 is a view showing the barrier mechanism in the case where the barrier blades 1 through 4 are in the closed state and where the four barrier blades 1 through 4 of the lower set are removed viewed from the image surface side. FIG. 22 is a view showing the barrier mechanism in the case where the barrier blades 1 through 4 are in the closed state and where the barrier cover 5 and a pair of the barrier blades 4 covering the outmost areas are removed viewed from the subject side. It should be noted that the barrier blades 2 through 4 are not shown in FIG. 18 and FIG. 19.

As shown in FIG. 18, in the closed state of the pair of the barrier blades 1, the tip part of the distal difference depression 1*k* of one (the other) barrier blade 1 projects from the proximal difference depression 1*j* of the other (one) barrier blade 1 to the opposite side, and reaches the subject-side end surface of the barrier driving ring 7. The tip part of the distal difference depression 1*k* moves along the subject-side end surface of the barrier driving ring 7 while the barrier blade 1 rotates from the closed state shown in FIG. 18 to the opened state shown in FIG. 19. In the closed state of the barrier blades 1 through 4, since the distal difference depression 1*k* of the barrier blade 1 of one set is covered with the barrier blades 2 through 4 of the other set, the distal difference depression 1*k* cannot be seen from outside. Moreover, when the barrier blade 1 receives static pressure, the tip part of the distal difference depression 1*k* is pushed against the subject-side end surface of the barrier driving ring 7. Accordingly, the tip part behaves as a static pressure stopping part.

As shown in FIG. 17 and FIG. 22, since the projecting part 3*d* of the barrier blade 3 runs on the subject-side end surface of the barrier driving ring 7 and overlaps in the optical axis direction in the closed state of the barrier blades 1 through 4, the barrier blade 3 withstands static pressure from the subject side even if the static pressure is applied.

Moreover, as shown in FIG. 10, since the projecting parts 4*d* and 4*e* of the barrier blade 4 run on the subject-side end surface of the barrier driving ring 7 and overlap in the optical axis direction in the closed state of the barrier blades 1 through 4, the barrier blade 4 withstands static pressure from the subject side even if the static pressure is applied.

As shown in FIG. 12 and FIG. 13, a hooking convex part 1*e* to which a hook of a link 2*b* formed on the barrier blade 2 made from metal material is hooked so as to be hooked and released is provided on the image surface side of the barrier blade 1 made from resin material. An inclination part is formed on the hooking convex part 1*e* at the side opposite to the part to which the hook of the link 2*b* is hooked. The inclination part has an introduction shape so as to hook the hook again at the time of assembling and when the hook is released. Here, the link 2*b* is equivalent to an example of the first link of the present invention.

A groove that allows the link 2*b* to move from the hooking convex part 1*e* to the distal difference depression 1*k* is formed on the barrier blade 1. A through hole is formed in the distal difference depression 1*k*. A convex part 1*p* that contacts with the first lens 10 in the optical axis direction when force like static pressure is applied from outside is formed on the barrier blade 1. A concave spherical part 1*q* and a concave curve part 1*r* as clearance configurations that prevent from hitting the first lens 10 during opening and closing of the barrier blade 1 are formed around the convex part 1*p*.

As shown in FIG. 13, the link 2*b* has a bending part 2*c*1 that is bended from the outer periphery of the barrier blade 2 to the image surface side by 90 degrees, and an arm 2*c*2 that is bended from the tip of the bending part 2*c*1 so as to extend in parallel to the barrier blade 2. A hook that is hooked by the hooking convex part 1*e* is formed at the tip of the arm 2*c*2. An outer periphery 1*g* of the barrier blade 1 is put between the barrier blade 2 and the arm 2*c*2 of the link 2*b* in the optical axis direction.

As shown in FIG. 14, the link 2*b* of the barrier blade 2 is located in the groove formed from the through hole to the hooking convex part 1*e* on the barrier blade 1 from the opened state to the closed state of the barrier blade 2. Accordingly, since the link 2*b* does not come out of the concave spherical part 1*q* and the concave curve part 1*r* formed around the convex part 1*p* and is located within the width of the barrier blade 1 in the rotational direction, the link 2*b* does not jump out of the barrier blade 1 to the side of the barrier driving ring 7. The through hole 1*f* is formed at the position that is not seen from the subject side in the closed state of the barrier blade 1.

A coil spring 6 is constituted by a tension spring, and has hooks 6*a* facing the same direction at both ends, as shown in FIG. 13. One hook 6*a* of the coil spring 6 is hooked by the hooking part 1*d* of the barrier blade 1, and the other hook 6*a* is hooked by the hooking part 7*g* of the barrier driving ring 7.

When being charged, the coil spring 6 generates energization force so as to mutually draw near the barrier blade 1 and the barrier driving ring 7. Namely, the charged coil spring 6 energizes the barrier blade 1 in a direction of an arrow B in FIG. 10 (a direction rotated from an opened position to a closed position), and energizes the barrier driving ring 7 in a direction of an arrow D in FIG. 10 (a direction rotated from the closed position to the opened position).

Figure 20:
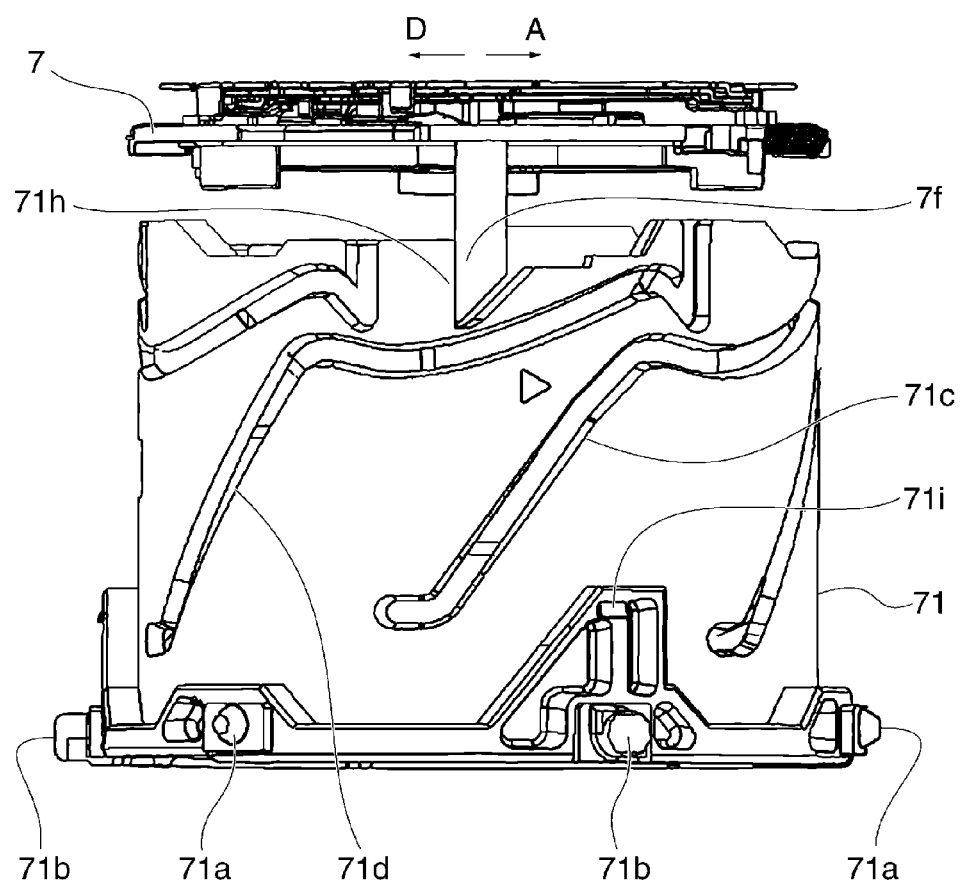
FIG. 20 is a sectional view showing a relationship between a moving cam barrel of the lens barrel shown in FIG. 2 and a barrier driving ring.

The barrier driving ring 7 is provided with an interlocking lever 7*f* extended to the image surface side. The interlocking lever 7*f* penetrates a hole 9*k* of the barrier barrel 9 and a hole 11*c* of the first lens barrel 11, as shown in FIG. 15. At the time of the collapsing operation of the lens barrel 201 (at the time of the closing operation of the barrier blades 1 through 4), as shown in FIG. 20, the interlocking lever 7*f* engages with a lever driving groove 71*h* formed on the moving cam barrel 71.

As shown in FIG. 14, when the barrier blade 1 rotates in a direction of an arrow E (from the closed position to the opened position), the outer periphery 1*g* of the barrier blade 1 contacts with the bending part 2*c*1 of the link 2*b* of the barrier blade 2. Moreover, when the barrier blade 1 rotates in the direction of the arrow B in FIG. 14 (from the opened position to the closed position), as shown in FIG. 13, the hook of the tip end of the arm 2*c*2 of the link 2*b* of the barrier blade 2 is hooked by the hooking convex part 1*e* of the barrier blade 1. Accordingly, the barrier blade 1 and the barrier blade 2 are connected, and the barrier blade 2 rotates in interlock with the rotational operation of the barrier blade 1.

Similarly, as shown in FIG. 12, a tip part 2*d* of the barrier blade 2 is hooked by a hook 3*b* of the tip part of the barrier blade 3. Accordingly, the barrier blade 3 rotates in interlock with the rotational operation of the barrier blade 2.

Moreover, the projecting part 3*d* of the barrier blade 3 is hooked by the hook 4*b* of the tip part of the barrier blade 4. Accordingly, the barrier blade 4 rotates in interlock with the rotational operation of the barrier blade 3. The link 2*b*, the hook 3*b*, and the hook 4*b* are arranged at the positions so that they do not interfere mutually at the time of the rotational operations of the barrier blades 1 through 4 in the openingand-closing direction. Here, the hook 3b is an example of the second link of the present invention, and the hook 4b is an example of the third link of the present invention.

The description returns to FIG. 4 and FIG. 5. The bayonet hooks 9c and 9d of the barrier barrel 9 are formed by slide molding in the directions that intersect perpendicularly with the optical axis. Accordingly, a plurality of lateral holes for the slide molding are formed in the bayonet hooks 9c and 9d at the image surface side. Then, the two hooks 5d of the barrier cover 5 are hooked by the two lateral holes 9f among a plurality of lateral holes of the barrier barrel 9. The screws 19 are inserted into holes 5c of the barrier cover 5. The screws 19 are fixed by fastening to screw holes 9e (see FIG. 10) of the barrier barrel 9.

Two hooks 8a and two hooks 8b are formed on the image surface side of the decorative ring 8. The decorative ring 8 is fixed to the barrier cover 5 by rotating the decorative ring 8 to engage the hooks 8a and 8b with the bayonet holes 5e and 5f of the barrier cover 5, respectively.

Next, operations of the barrier mechanism from the opened state to the closed state of the barrier blades 1 through 4 will be described. It should be noted that operations of only one set of the barrier blades 1 through 4 will be described because open-close operations of one set of the barrier blades 1 through 4 are identical to open-close operations of the other set of the barrier blades 1 through 4.

As shown in FIG. 20, the moving cam barrel 71 has the lever driving groove 71h at the position corresponding to the interlocking lever 7f of the barrier driving ring 7. The lever driving groove 71h pushes the interlocking lever 7f to rotate the barrier driving ring 7 in accordance with the rotation of the moving cam barrel 71 during the collapsing operation of the lens barrel 201.

Since the interlocking lever 7f is pushed by the lever driving groove 71h of the moving cam barrel 71, the barrier driving ring 7 rotates in the direction of the arrow A in FIG. 10 from the opened state of the barrier blades 1 through 4 shown in FIG. 9. When the barrier driving ring 7 rotates in the direction of the arrow A, the coil spring 6 is charged. The barrier blade 1 is pulled by the energization force of the coil spring 6, and rotates in the direction of the arrow B around the shaft 1a. Thus, the barrier driving ring 7 rotates barrier blade 1 to the closed position through the coil spring 6.

The barrier blade 2 overlaps with the barrier blade 1. When the frictional force between the barrier blades 1 and 2 is high, the barrier blade 2 begins to rotate in the direction of the arrow B together with the barrier blade 1 due to the frictional force. When the frictional force between the barrier blades 1 and 2 is low, the barrier blade 2 does not follow the rotation of the barrier blade 1. The barrier blade 2 relatively rotates with respect to the barrier blade 1 in the direction of the arrow C that is opposite to the direction of the arrow B.

Accordingly, when the rotational angle of the barrier blade 1 in the direction of the arrow B around the shaft 1a shall be B1 and the relative rotational angle of the barrier blade 2 in the direction of the arrow C around the shaft 1b shall be C2, the shaft 2b of the barrier blade 1 rotates around the shaft 1a by the angle C2. That is, the barrier blade 2 rotates by an angle (B1-C2) shown in FIG. 10 along a track of revolution around the shaft 1a of the barrier blade 1.

When the relative rotational angle of the barrier blade 3, which overlaps with the barrier blade 2, in the direction of the arrow C with respect to the barrier blade 1 shall be C3, the barrier blade 3 also rotates by an angle (B1-C3) shown in FIG. 10. When the relative rotational angle of the barrier blade 4, which overlaps with the barrier blade 3, in the direction of the arrow C with respect to the barrier blade 1 shall be C4, the barrier blade 4 also rotates by an angle (B1-C4) shown in FIG. 10.

When the hooking convex part 1e of the barrier blade 1 is caught in the hook of the link 2b of the barrier blade 2 as shown in FIG. 12 and FIG. 13, the rotation of the barrier blade 2 around the shaft 1b in the direction of the arrow C stops, and the barrier blade 2 begins to rotate in the direction of the arrow B in interlock with the rotational operation of the barrier blade 1. Then, when the tip part 2d of the barrier blade 2 is caught in the hook 3b of the barrier blade 3, the barrier blade 3 rotates in interlock with the rotational operation of the barrier blades 1 and 2. Furthermore, when the projecting part 3d of the barrier blade 3 is caught in the hook 4b of the barrier blade 4, the barrier blade 4 rotates in interlock with the rotational operation of the barrier blades 1 through 3.

Moreover, the barrier blade 1 runs against the barrier blade 1 of the other side, and stops. At this time, the barrier blades 2 through 4 are integrally rotated in the direction of the arrow B. The barrier blade 4 stops when the tip part of the hook 4b runs against a stopper 5g of the barrier cover 5 as shown in FIG. 21. Accordingly, the opening part 5a of the barrier cover 5 is closed with the barrier blades 1 through 4, the subject side of the first lens 10 is covered and protected.

In this embodiment, the first lens 10 is a convex lens projected to the subject side. Then, the link 2b does not pass the center of the subject side convex surface of the first lens 10 during the barrier blade 2 rotates from the opened position to the closed position, and is arranged at the position of which distance from the rotation shaft 1a is longer than the distance between the rotation shaft 1a and the center of the subject side convex surface of the first lens 10.

Figure 23:
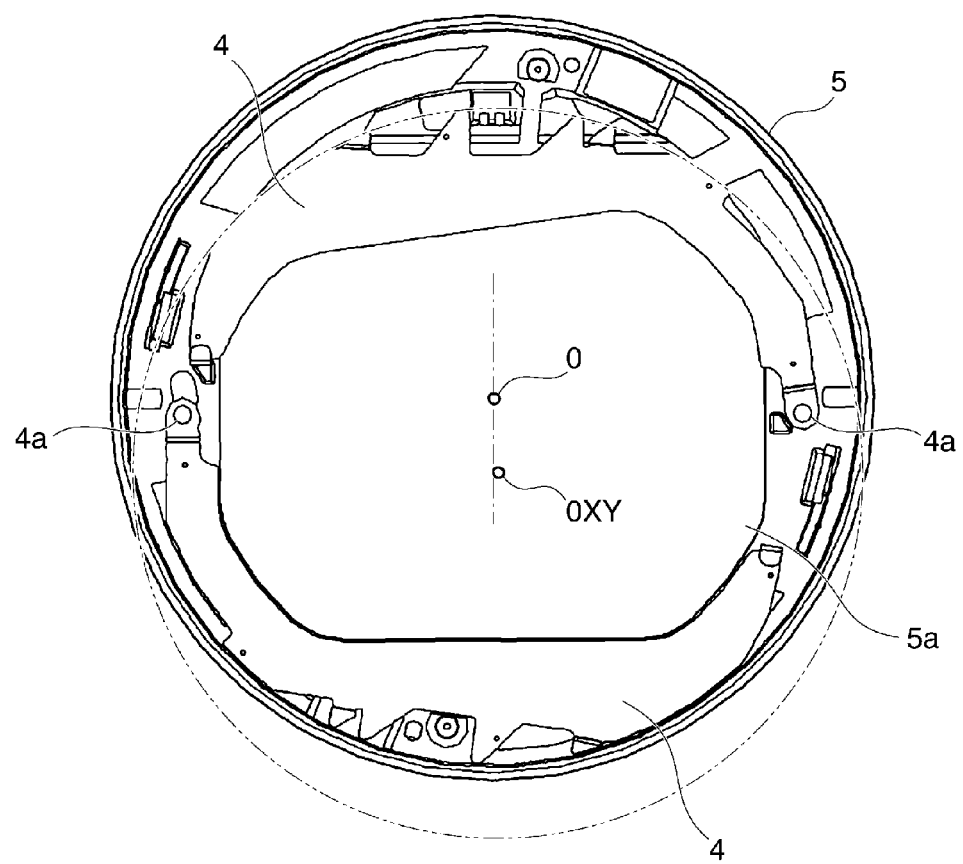
FIG. 23 is a view showing a positional relationship between the barrier blades positioned nearest to the subject side and the barrier cover in the barrier mechanism.

FIG. 23 is a view showing a positional relationship between the barrier blades 4 positioned nearest to the subject side and the barrier cover 5. In FIG. 23, the upper barrier blade 4 between the pair of the barrier blades 4 is arranged in the closed position, and the lower barrier blade 4 is arranged in the opened position.

As shown in FIG. 23, the center O of the circumscribed circle of the outer circumference of the lower barrier blade 4 in the opened position coincides with the optical axis O that is the center of the barrier cover 5 and the barrier barrel 9. Then, the center Oxy of the circumscribed circle of the outer circumference of the upper barrier blade 4 in the closed position is arranged at a position near the center line parallel to the short side of the opening part 5a of the barrier cover 5. Since a deviation of the center Oxy from the center line at this time is nearly equal to an amount of deviation due to a manufacturing error, it can be said that the center Oxy is mostly arranged on the center line. Accordingly, the upper barrier blade 4 closes almost uniformly the both corners of the upper part of the opening part 5a.

Figure 24:
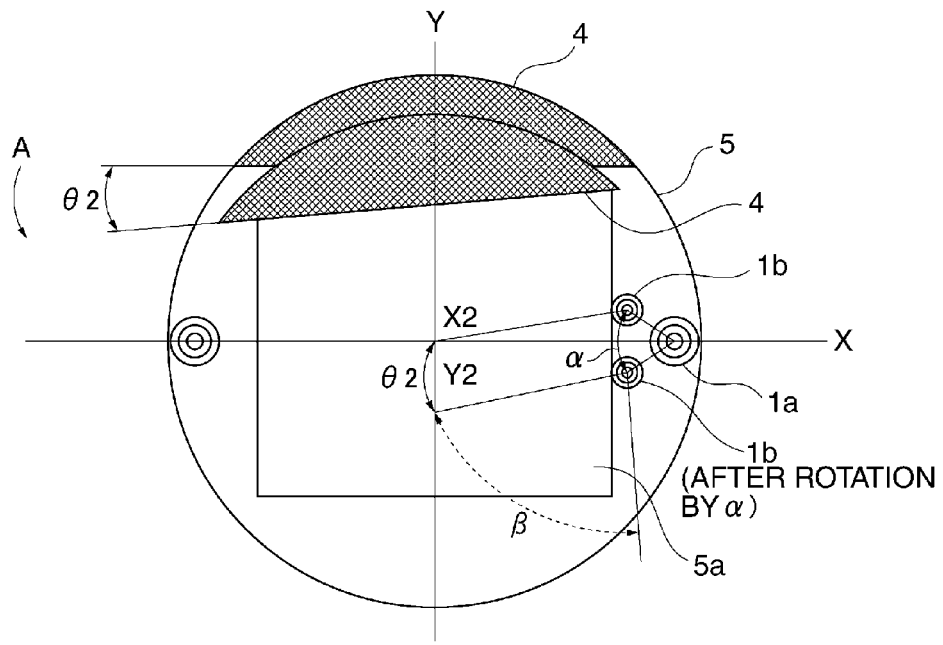
FIG. 24 is a schematic view for describing an open-close operation of the barrier blade using two shafts in the barrier mechanism.
Figure 25:
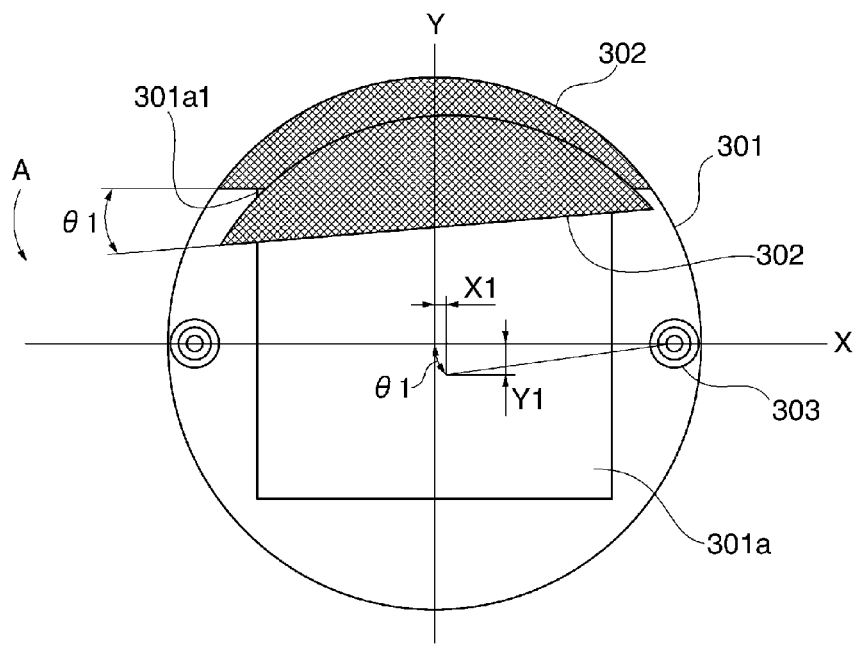
FIG. 25 is a schematic view showing the conventional barrier mechanism.

The above-mentioned matter will be described in more detail with reference to FIG. 24. FIG. 24 is a schematic view for describing an open-close operation of the barrier blade 4 using the two shafts 1a and 1b.

As shown in FIG. 24, when the barrier blade 4 is in the opened position, the circumscribed circle of the outer circumference of the barrier blade 4 coincides with the outer circumference of the barrier cover 5. When the barrier blade 4 rotates by θ2 in a direction of an arrow A in FIG. 24 towards the closed position from the opened position, the shaft 1b of the barrier blade 4 rotates around the shaft 1a of the barrier blade 1. Then, in the closed position of the barrier blade 4, the shaft 1b rotates by an angle α, equivalent to the angle shown by the arrow B1 or E1 shown in FIG. 10 and FIG. 21, and the barrier blade 4 rotates by an angle β, equivalent to the angle shown by the arrow C4 or F4 around the shaft 1b moved by the angle α, in the opposite direction.

Accordingly, the barrier blade 4 rotates by an angle η2 (=α−β) as a result. When the shaft 1b is arranged so that a value of X2 in an X-axis direction is nearly equal to 0 in FIG. 24, the barrier blade 4 moves only in a Y-axis direction by Y2 without moving in the X-axis direction mostly. Accordingly, since the barrier blade 4 of the closed state after rotating by the angle θ2 (=α−β) moves the position lowered by Y2 in the Y-axis direction without moving in the X-axis direction mostly, the barrier blade 4 closes the both corners of the upper part of the opening part 5a uniformly. It should be noted that the value of X2 in the X-axis direction does not necessarily set to about 0. The value of X2 can be set to another value as long as the barrier blade 4 closes the both corners of the upper part of the opening part 5a uniformly.

Next, operations of the barrier mechanism from the closed state to the opened state of the barrier blades 1 through 4 will be described. It should be noted that operations form the closed state to the opened state of only one set of the barrier blades 1 through 4 will be described because open-close operations of one set of the barrier blades 1 through 4 are identical to open-close operations of the other set of the barrier blades 1 through 4.

In the closed state of the barrier blades 1 through 4 shown in FIG. 10, when the moving cam barrel 71 rotates according to the extending operation from the collapsed state of the lens barrel 201, the state where the interlocking lever 7f was pushed by the lever driving groove 71h is released. Accordingly, the barrier driving ring 7 rotates in the direction of the arrow D in FIG. 10 by the energization force of the charged coil spring 6.

When the barrier driving ring 7 rotates in the direction of the arrow D, a wall part 7b formed on the barrier driving ring 7 pushes a projection 1c of the barrier blade 1. Accordingly, the barrier blade 1 begins to rotate around the shaft 1a in the opening direction in response to the driving force in the direction of the arrow E.

When the barrier driving ring 7 further continues rotating in the direction of the arrow D and the barrier blade 1 rotates in the direction of the arrow E, the outer periphery 1g of the barrier blade 1 contacts with the bending part 2c of the barrier blade 2 as shown in FIG. 14. After the contact, the barrier blade 2 begins to rotate around the shaft 1a in the direction of the arrow E together with the barrier blade 1.

At this time, since the barrier blade 2 is fitted into the shaft 1b, the barrier blade 2 moves by the rotation of the shaft 1b around the shaft 1a. However, the barrier blade 2 relatively rotates around the shaft 1b in a direction of an arrow F opposite to the direction of the arrow E with inertia force before the outer periphery 1g of the barrier blade 1 contacts with the bending part 2c of the barrier blade 2. Namely, the barrier blade 2 rotates around the shaft 1a by the angle (E1-F2) in FIG. 10 in the direction of the arrow E to the opened position together with the barrier blade 1.

Here, the angle E1 shall be the rotational angle of the barrier blade 1 around the shaft 1a in the direction of the arrow E, and the angle F2 shall be the relative rotational angle of the barrier blade 2 around the shaft 1b in the direction of the arrow F until the outer periphery 1g of the barrier blade 1 contacts with the bending part 2c of the barrier blade 2.

When the barrier blade 2 rotates in the direction of the arrow E together with the barrier blade 1 after that, the outer periphery 1h of the barrier blade 1 runs against the bending part 3c of the barrier blade 3 as shown in FIG. 12. Then, the barrier blade 3 rotates around the shaft 1a by the angle (E1-F3) in FIG. 10 to the opened position in the direction of the arrow E together with the barrier blades 1 and 2 in the same manner as the barrier blade 2.

Here, the angle F3 shall be the relative rotational angle of the barrier blade 3 around the shaft 1b in the direction of the arrow F until the outer periphery 1h of the barrier blade 1 contacts with the bending part 3c of the barrier blade 3.

When the barrier blade 3 further rotates in the direction of the arrow E together with the barrier blades 1 and 2, an outer periphery 1i of the barrier blade 1 runs against the bending part 4c of the barrier blade 4 as shown in FIG. 12. Then, the barrier blade 4 rotates around the shaft 1a by the angle (E1-F4) in FIG. 10 to the opened position in the direction of the arrow E together with the barrier blades 1 through 3 in the same manner as the barrier blade 2.

Here, the angle F4 shall be the relative rotational angle of the barrier blade 4 around the shaft 1b in the direction of the arrow F until the outer periphery 1i of the barrier blade 1 contacts with the bending part 4c of the barrier blade 4.

After that, a tip part 1n of the barrier blade 1 runs against a stopper 9j of the barrier barrel 9 as shown in FIG. 10, and the barrier blade 1 stops. Accordingly, the barrier blades 1 through 4 are stored at the opened position, the opening part 5a of the barrier cover 5 is opened, and the opened state shown in FIG. 7 and FIG. 9 is maintained.

At this time, the barrier blade 1 and the barrier blade 2 are arranged at the positions that overlap to each other in the optical axis direction. And the barrier blade 3 is arranged at the position that overlaps with the barrier blades 1 and 2 in the optical axis direction, and the barrier blade 4 is also arranged at the position that overlaps with the barrier blades 1 through 3 in the optical axis direction.

As described above, the four pairs of the barrier blades 1 through 4 (eight blades in total) are efficiently stored in the radial direction of the lens barrel 201 at the opened position in this embodiment. This increases the number of barrier blades and reduces the outer diameter of the lens barrel 201 with respect to the opening part 5a of the barrier mechanism.

Moreover, the rotation shaft 1a of the barrier blade 1 is fixed, and the rotation shaft 1b of the barrier blades 2 through 4 revolves around the rotation shaft 1a in this embodiment. This prevents the barrier blades 1 through 4 from generating a gap between the blades and the opening part 5a in the closed state without causing complication of a configuration and degradation of assemblability.

Moreover, since the barrier blades 1 through 4 open and close by rotations using the two shafts 1a and 1b in this embodiment, the degree of freedom of the design layout of the barrier blades 1 through 4 increases. Moreover, since the frictional force in this embodiment is smaller than the frictional force in a case where barrier blades are opened and closed by a rectilinear-propagation sliding mechanism, required power for an actuator is comparatively small.

Moreover, since the shaft 1a is arranged on the center line that is nearly parallel to the long side (or the short side) of the opening part 5a in this embodiment, the shaft 1a is not exposed even if the barrel diameter becomes small with respect to the size of the opening part 5 and the retracted space of the barrier blades 1 through 4 becomes small. This avoids operation failure due to the clogging of the bearing of the shaft 1a with garbage etc., and avoids defect like deterioration in the external appearance.

Moreover, the projecting parts 3d, 4d, and 4e of the barrier blades 3 and 4 run on the subject-side end surface of the barrier driving ring 7 in the closed state of the barrier blades 1 through 4, and are arranged so as to overlap in the optical axis direction in this embodiment. Accordingly, even if the barrier blades 3 and 4, which are distant from the first lens 10 in the optical axis direction, receive static pressure from the subject side, the barrier blades 3 and 4 withstand the static pressure concerned certainly.

Moreover, the projecting part 3d of the barrier blade 3 is inserted, in the radial direction, into the lateral groove 5d provided in the inner periphery of the barrier cover 5 of which the diameter is larger than the barrier barrel 9 in the opened state of the barrier blades 1 through 4 in this embodiment. Accordingly, since the projecting part 3d of the barrier blade 3 is extended to the outside of the outer periphery of the barrier barrel 9 in the radial direction, an enough size of the projecting part 3d for withstanding static pressure is obtained.

Moreover, the projecting part 3d of the barrier blade 3 overlaps with the projecting part 4e of the barrier blade 4 in the optical axis direction in the opened state of the barrier blades 1 through 4 in this embodiment. Accordingly, the parts that receive static pressure are stored efficiently in the opened position of the barrier blades 1 through 4.

When the pair of barrier blades 1 are in the closed state, the distal difference depression 1k of one (the other) barrier blade 1 is inserted into the proximal difference depression 1j of the other (one) barrier blade 1 in the rotational direction so that the distal difference depression 1k and the proximal difference depression are arranged facing mutually in the optical axis direction in this embodiment. Then, the tip part of the distal difference depression 1k of one (the other) barrier blade 1 projects from the proximal difference depression 1j of the other (one) barrier blade 1 to the opposite side, reaches the subject-side end surface of the barrier driving ring 7, and moves along the end surface during the rotation from the closed state to the opened state.

Accordingly, even if the outer diameter of the lens barrel 201 is made small with respect to the opening part 5 by increasing the number of barrier blades, the tip part of the barrier blade 1 withstands static pressure received because the tip part runs on the end surface of the barrier driving ring in the closed state of the barrier blade 1. Moreover, in the closed state of the barrier blades 1, since the proximal difference depression 1j is provided at the image surface side of the barrier blade 1, the distal difference depression 1k cannot be seen from outside.

Moreover, the barrier blade 2 that is made from metal material has the link 2b with the U-shaped bending part 2c1, the barrier blade 1 that is made from resin material is put between the barrier blade 2 and the arm 2c2 of the link 2b, and the hook of the tip end of the arm 2c2 is hooked by the hooking convex part 1e of the barrier blade 1. Accordingly, since the link 2b is arranged at the reverse side of the external appearance (subject side) of the lens barrel 201, it cannot be seen from outside.

Moreover, since the link 2b is inside the barrier blade 1 (the image surface side) in this embodiment even though the barrier blade 3 is overlapped at the subject side of the barrier blade 2 in this embodiment, the barrier blade 2 does not interfere with the barrier blade 3 mechanistically.

Moreover, since the link 2b is inside the barrier blade 1 (the image surface side) in this embodiment, it interferes with neither the barrier driving ring 7 nor the first lens 10.

It should be noted that the present invention is not limited to what has been described in the above-mentioned embodiment, quality of the material, a shape, a size, a formation, the number of elements, arrangement locations, etc., can be changed suitably unless it is deviated from the scope of the present invention.

For example, although the barrier mechanism used for the digital still camera is described in the above-mentioned embodiment, a target of the present invention is not limited to this. The present invention may be applied to the barrier mechanism used for apparatuses containing a film-based camera, a digital video camera, a portable terminal with a camera function, and other optical apparatuses and optical apparatuses.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-006035 and No. 2014-006033, filed Jan. 16, 2014, which are hereby incorporated by reference herein in their entireties.

What is claimed is:

1. An optical apparatus equipped with a barrier mechanism covering a lens exposed to a subject side through an opening part, the barrier mechanism comprising:
   a barrier driving ring;
   a plurality of barrier blades configured to be arranged overlapping in an optical axis direction of an optical axis of the optical apparatus, and to be driven by said barrier driving ring to rotate in an opening-and-closing direction for opening and closing the opening part; and
   a barrier barrel configured to be arranged at the outer peripheral side of said barrier driving ring, and to hold said barrier blades,
   wherein said plurality of barrier blades include:
      a main barrier blade arranged at an image surface side and supported by said barrier barrel with a first shaft so as to be rotatable in the opening-and-closing direction; and
      at least first and second auxiliary barrier blades supported by a second shaft provided on the subject side of the main barrier blade so as to be rotatable in the opening-and-closing direction,
   wherein the second shaft is located between the first shaft and the optical axis as viewed from the optical axis direction, when a line connecting the optical axis and an axis of the first shaft is disposed along an X-axis, while an Y-axis is defined to be perpendicular to both the optical axis and the X-axis,
   wherein the second shaft revolves around the first shaft,
   wherein each of the first and second auxiliary barrier blades is not directly connected to the first shaft so that each of the first and second auxiliary barrier blades is rotatable about the second shaft without coaxially rotating with the first shaft, and
   wherein each of the first and second auxiliary barrier blades is rotatable about the second shaft in a direction that is opposite in a revolving direction of the second shaft around the first shaft so that when the first and second auxiliary blades are rotating in the opening-and-closing direction thereof while the second shaft is revolving around the first shaft through the X-axis, moving amounts of the first and second auxiliary barrier blades in an Y-axis direction are greater than moving amounts of the first and second auxiliary barrier blades in an X-axis direction.

2. The optical apparatus according to claim 1, wherein:
the main barrier blade is made from resin material, and
the first and second auxiliary barrier blades are made from metal material.

3. The optical apparatus according to claim 1, wherein:
the opening part has a rectangular shape, and
a bearing of the first shaft is arranged on a center line that is nearly parallel to one of a long side and a short side of the opening part.

4. The optical apparatus according to claim 3, wherein an auxiliary barrier blade nearest to the subject side among the first and second auxiliary barrier blades is arranged so that a line connecting a center of a circumscribed circle of the first and second auxiliary barrier blades in an opened state to the center of the circumscribed circle in a closed state is nearly parallel to one of a long side and a short side of the opening part.

* * * * *